United States Patent
Garg et al.

(10) Patent No.: US 11,831,421 B2
(45) Date of Patent: Nov. 28, 2023

(54) DEPLOYING A FUNCTION IN A HYBRID CLOUD

(71) Applicant: Microsoft Technology Licensing, LLC, Redmond, WA (US)

(72) Inventors: Shikha Garg, Houston, TX (US);
Daniel Keith Scholl, Dallas, TX (US);
Mehmet Kadri Umay, Redmond, WA (US); Imran Siddique, Bellevue, WA (US); Nayana Singh Patel, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/652,467

(22) Filed: Feb. 24, 2022

(65) Prior Publication Data

US 2023/0179650 A1 Jun. 8, 2023

Related U.S. Application Data

(60) Provisional application No. 63/264,830, filed on Dec. 2, 2021.

(51) Int. Cl.
*H04L 67/1001* (2022.01)
*H04L 43/0852* (2022.01)
(Continued)

(52) U.S. Cl.
CPC ...... *H04L 67/1001* (2022.05); *G06F 9/45558* (2013.01); *G06F 18/214* (2023.01);
(Continued)

(58) Field of Classification Search
CPC ............ H04L 67/1001; H04L 43/0852; H04L 43/0876; G06F 18/214; G06F 18/2137;
(Continued)

(56) References Cited

U.S. PATENT DOCUMENTS 10,897,468 B1 * 1/2021 Chhabra ............... H04L 9/3226
2018/0307945 A1 * 10/2018 Haigh .................... G06F 18/214
(Continued)

OTHER PUBLICATIONS

Alhazmi, et al., "Optimized Provisioning of SDN-enabled Virtual Networks in Geo-Distributed Cloud Computing Datacenters", In Journal of Communications and Networks, vol. 19, Issue 4, Aug. 2017, pp. 402-415.
(Continued)

*Primary Examiner* — Frantz B Jean
(74) *Attorney, Agent, or Firm* — Alleman Hall Creasman & Tuttle LLP

(57) ABSTRACT

A remote server computing system is configured to deploy a cloud-service-managed control plane and a cloud service data plane spanning the remote server computing system, a local edge computing device, and a local on-premises computing device connected in a hybrid cloud environment. Energy-related training data is received including a plurality of energy-related training data pairs. A machine learning function is trained using the plurality of training data pairs to predict a classified label for restricted energy-related data that is not accessible to the remote server computing system. The trained machine learning function is deployed to the one or more of the local edge computing device and the local on-premises computing device via the cloud service data plane. The remote server computing system is further configured to receive, via the cloud service data plane, classified output of the trained machine learning function.

19 Claims, 16 Drawing Sheets

(51) Int. Cl.
*G06F 9/455* (2018.01)
*H04L 43/0876* (2022.01)
*G06N 3/02* (2006.01)
*G06F 18/214* (2023.01)
*G06F 18/2137* (2023.01)

(52) U.S. Cl.
CPC .......... *G06F 18/2137* (2023.01); *G06N 3/02* (2013.01); *H04L 43/0852* (2013.01); *H04L 43/0876* (2013.01); *G06F 2009/4557* (2013.01); *G06F 2009/45595* (2013.01); *G06F 2209/505* (2013.01)

(58) Field of Classification Search
CPC ......... G06F 9/45558; G06F 2009/4557; G06F 2009/45595; G06F 2209/505; G06N 3/02
USPC ........................................................ 709/224
See application file for complete search history.

(56) References Cited

U.S. PATENT DOCUMENTS

| | | | |
|---|---|---|---|
| 2019/0332895 | A1 | 10/2019 | Anghel et al. |
| 2020/0327371 | A1* | 10/2020 | Sharma .................... G06N 3/08 |
| 2022/0067450 | A1* | 3/2022 | Verma .................... G06N 20/00 |
| 2022/0083906 | A1* | 3/2022 | Ong ....................... G06F 18/254 |
| 2022/0198304 | A1* | 6/2022 | Szczepanik ......... G06F 16/2474 |
| 2023/0037308 | A1* | 2/2023 | Qin ..................... H04L 43/0811 |
| 2023/0176888 | A1 | 6/2023 | Garg et al. |

OTHER PUBLICATIONS

"International Search Report issued in PCT Application No. PCT/US22/042323", dated Nov. 18, 2022, 13 Pages.

"International Search Report issued in PCT Application No. PCT/US22/042578", dated Dec. 2, 2022, 11 Pages.

"Azure Geographies", Retrieved From: https://azure.microsoft.com/en-us/global-infrastructure/geographies/#customer-stories, Retrieved on: Jan. 21, 2022, 12 Pages.

"List of Countries by Proven Oil Reserves", Retrieved From: https://en.wikipedia.org/wiki/List_of_countries_by_proven_oil_reserves, Jan. 3, 2022, 7 Pages.

"Microsoft Cloud Adoption Framework for Azure", Retrieved From: https://azure.microsoft.com/en-us/cloud-adoption-framework/#overview, Retrieved on: Nov. 26, 2021, 10 Pages.

Sudbring, et al., "What is Azure Private Endpoint?", Retrieved From: https://docs.microsoft.com/en-us/azure/private-link/private-endpoint-overview, Oct. 15, 2021, 5 Pages.

"Azure Arc enabled Kubernetes with GitOps | Azure Friday", Retrieved From: https://www.youtube.com/watch?v=4fT47TKprFQ&t=549s, Dec. 4, 2020, 3 Pages.

"Hybrid and Multicloud Solutions", Retrieved from: https://web.archive.org/web/20220117025124/https://azure.microsoft.com/en-us/solutions/hybrid-cloud-app/, Jan. 17, 2022, 9 Pages.

Chacon, et al., "Pro Git", In Publication of Apress, Second Edition, Oct. 25, 2021, 519 Pages.

Ross, Rick, "Kubernetes: Your Hybrid Cloud Strategy", In Journal of Google Cloud: Kubernetes, Retrieved on: Feb. 1, 2022, pp. 1-5.

* cited by examiner

1200

1202 — PRESENT A USER INTERFACE WITH A PLURALITY OF DEPLOYMENT CONFIGURATION OPTIONS INCLUDING COMPUTE CONFIGURATION OPTIONS AND DATA STORAGE CONFIGURATION OPTIONS FOR ENERGY-RELATED DATA WITHIN THE HYBRID CLOUD ENVIRONMENT

1204 — THE PLURALITY OF DEPLOYMENT CONFIGURATION OPTIONS INCLUDES A REGULATORY COMPLIANCE TEMPLATE SPECIFYING THAT THE ENERGY RELATED DATA IS STORED ON ONE OR MORE STORAGE DEVICES LOCATED WITHIN A GEOGRAPHIC AREA, AND THE ENERGY RELATED DATA IS SUBJECT TO A DATA TRANSMISSION RESTRICTION WITHIN THE GEOGRAPHIC AREA

1206 — DETERMINE THAT THE REMOTE SERVER COMPUTING SYSTEM IS LOCATED IN A SOVEREIGN CLOUD, WHEREIN THE REGULATORY COMPLIANCE TEMPLATE PERMITS ACCESS TO THE ENERGY RELATED DATA VIA THE SOVEREIGN CLOUD; AND RECEIVE, VIA THE DATA PLANE, AT LEAST A PORTION OF THE ENERGY-RELATED DATA SUBJECT TO THE DATA TRANSMISSION RESTRICTION OR THE LOCAL STORAGE RESTRICTION

1208 — DETERMINE THAT A LATENCY OF A NETWORK CONNECTION BETWEEN THE REMOTE SERVER COMPUTING SYSTEM AND THE LOCAL EDGE COMPUTING DEVICE IS GREATER THAN OR EQUAL TO A THRESHOLD LATENCY, WHEREIN THE PLURALITY OF DEPLOYMENT CONFIGURATION OPTIONS INCLUDES A HIGH-LATENCY NETWORK TEMPLATE SPECIFYING THAT THE ENERGY-RELATED DATA IS PROCESSED AT THE LOCAL EDGE COMPUTING DEVICE; AND BASED ON DETERMINING THAT THE LATENCY OF THE NETWORK CONNECTION IS GREATER THAN OR EQUAL TO THE THRESHOLD LATENCY, POPULATE THE USER INTERFACE WITH THE HIGH-LATENCY NETWORK TEMPLATE

1210 — DETERMINE THAT A DATA VOLUME OF THE ENERGY-RELATED DATA IS GREATER THAN OR EQUAL TO A THRESHOLD DATA VOLUME, WHEREIN THE PLURALITY OF DEPLOYMENT CONFIGURATION OPTIONS INCLUDES A HIGH-DATA-VOLUME TEMPLATE SPECIFYING THAT THE ENERGY-RELATED DATA IS STORED AND PROCESSED AT THE LOCAL EDGE COMPUTING DEVICE; AND BASED ON DETERMINING THAT THE DATA VOLUME OF THE ENERGY-RELATED DATA IS GREATER THAN OR EQUAL TO THE THRESHOLD DATA VOLUME, POPULATE THE USER INTERFACE WITH THE HIGH-DATA-VOLUME TEMPLATE

1212 — DETERMINE THAT A NETWORK CONNECTION BETWEEN THE LOCAL EDGE COMPUTING DEVICE AND THE LOCAL COMPUTE RESOURCES IS INTERMITTENT, WHEREIN THE PLURALITY OF DEPLOYMENT CONFIGURATION OPTIONS INCLUDES AN INTERMITTENT CONNECTION TEMPLATE SPECIFYING THAT THE ENERGY-RELATED DATA IS CACHED AND PROCESSED ON THE LOCAL COMPUTE RESOURCES AND STORAGE; AND BASED ON DETERMINING THAT THE NETWORK CONNECTION IS INTERMITTENT, POPULATE THE USER INTERFACE WITH THE INTERMITTENT CONNECTION TEMPLATE

1402 RECEIVE ENERGY-RELATED TRAINING DATA INCLUDING A PLURALITY OF ENERGY-RELATED TRAINING DATA PAIRS, EACH ENERGY-RELATED TRAINING DATA PAIR INCLUDING AS INPUT, REMOTE DATA ACCESSIBLE BY THE REMOTE SERVER COMPUTING SYSTEM, AND A LABEL SERVING AS GROUND-TRUTH OUTPUT

1404 THE CLOUD-SERVICE-MANAGED CONTROL PLANE IS CONFIGURED TO ENFORCE A REGULATORY COMPLIANCE DATA CONTROL POLICY SPECIFYING THAT THE ENERGY-RELATED DATA IS STORED ON ONE OR MORE STORAGE DEVICES LOCATED WITHIN A GEOGRAPHIC AREA, AND THE ENERGY-RELATED DATA IS SUBJECT TO THE DATA TRANSMISSION RESTRICTION WITHIN THE GEOGRAPHIC AREA

1406 DETERMINE THAT A LATENCY OF A CONNECTION BETWEEN THE REMOTE SERVER COMPUTING SYSTEM AND THE LOCAL EDGE COMPUTING DEVICE IS GREATER THAN OR EQUAL TO A THRESHOLD LATENCY; AND BASED ON DETERMINING THAT THE LATENCY OF THE NETWORK CONNECTION IS GREATER THAN OR EQUAL TO THE THRESHOLD LATENCY, THE CLOUD-SERVICE-MANAGED CONTROL PLANE IS CONFIGURED TO ENFORCE A HIGH-LATENCY NETWORK TEMPLATE SPECIFYING THAT THE ENERGY-RELATED DATA IS PROCESSED AT THE LOCAL EDGE COMPUTING DEVICE

1408 DETERMINE THAT A DATA VOLUME OF THE ENERGY-RELATED DATA IS GREATER THAN OR EQUAL TO A THRESHOLD DATA VOLUME, AND BASED ON DETERMINING THAT THE DATA VOLUME OF THE ENERGY-RELATED DATA IS GREATER THAN OR EQUAL TO THE THRESHOLD DATA VOLUME, THE CLOUD-SERVICE-MANAGED CONTROL PLANE IS CONFIGURED TO ENFORCE A HIGH-DATA-VOLUME TEMPLATE SPECIFYING THAT THE ENERGY-RELATED DATA IS STORED AND PROCESSED AT THE LOCAL EDGE COMPUTING DEVICE

1410 DETERMINE THAT A NETWORK CONNECTION BETWEEN THE LOCAL EDGE COMPUTING DEVICE AND THE LOCAL ON-PREMISES COMPUTING DEVICE IS INTERMITTENT; AND BASED ON DETERMINING THAT THE NETWORK CONNECTION IS INTERMITTENT, THE CLOUD-SERVICE-MANAGED CONTROL PLANE IS CONFIGURED TO ENFORCE AN INTERMITTENT CONNECTION TEMPLATE SPECIFYING THAT THE ENERGY-RELATED DATA IS CACHED AND PROCESSED ON THE LOCAL COMPUTE RESOURCES AND STORAGE

1412 THE REMOTE DATA ACCESSIBLE BY THE REMOTE SERVER COMPUTING SYSTEM COMPRISES AN UNRESTRICTED SUBSET OF THE ENERGY-RELATED DATA

DEPLOYING A FUNCTION IN A HYBRID CLOUD

CROSS REFERENCE TO RELATED APPLICATIONS

This application claims priority to U.S. Provisional Patent Application No. 63/264,830, filed Dec. 2, 2021, and entitled "DEPLOYING A FUNCTION IN A HYBRID CLOUD", the entirety of which is hereby incorporated herein by reference for all purposes.

BACKGROUND

Energy companies can generate large amounts of data from such activities as energy exploration, production, transport, and usage. Such data is often processed and stored using hardware and software that is specialized to applications within the energy industry.

SUMMARY

Examples are disclosed that relate to computing devices and methods for processing energy-related data in a hybrid cloud environment. One example provides a remote server computing system, comprising a processor and a memory storing instructions executable by the processor. The instructions are executable to deploy a cloud-service-managed control plane and a cloud service data plane spanning the remote server computing system, a local edge computing device, and a local on-premises computing device. The remote server computing system, the local edge computing device, and the local on-premises computing device are connected in a hybrid cloud environment. Energy-related training data is received including a plurality of energy-related training data pairs. Each energy-related training data pair includes, as input, remote data accessible by the remote server computing system, and a label serving as ground-truth output. A machine learning function is trained using the plurality of training data pairs to predict a classified label for restricted energy-related data that is restricted by the cloud-service-managed control plane to one or more of the local edge computing device and the local on-premises computing device. The restricted energy-related data is not accessible to the remote server computing system due to transmission or storage restriction on the restricted data. The trained machine learning function is deployed to the one or more of the local edge computing device and the local on-premises computing device via the cloud service data plane. The remote server computing system is further configured to receive, via the cloud service data plane, classified output of the trained machine learning function.

Another aspect provides a computing system, comprising a processor; and a memory storing instructions executable by the processor. The instructions are executable to output energy-related training data accessible by a remote server computing system. A trained query engine is received from the remote server computing system. The trained query engine is configured to parse and execute a query on restricted energy-related data that is restricted by the cloud-service-managed control plane to one or more of the local edge computing device and the local on-premises computing device. The restricted energy-related data is not accessible to the remote server computing system due to transmission or storage restriction on the restricted data. The computing system is further configured to receive an index of at least the restricted energy-related data and receive the query. The query engine is used to parse the query and execute the parsed query on the index to thereby generate one or more query results, and to output the one or more query results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 12A-12B show a block diagram of an example method for providing cloud-service-managed governance in a hybrid cloud environment.

FIGS. 14A-14B show a block diagram of an example method for processing energy-related data in a hybrid cloud environment.

DETAILED DESCRIPTION

Figure 1:
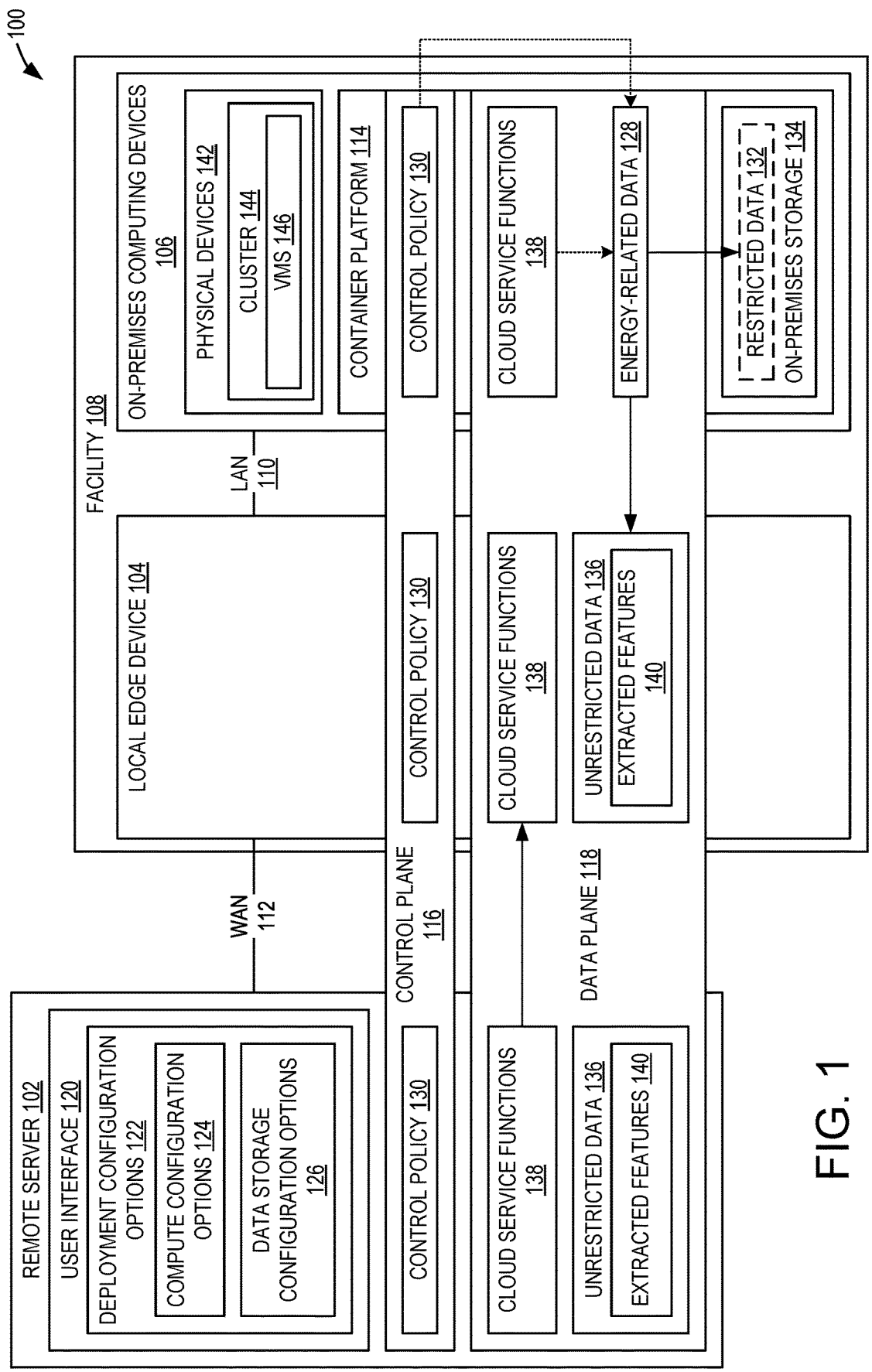
FIG. 1 shows a schematic view of an example of a hybrid cloud environment.

As introduced above, energy companies can produce large volumes of data during activities such as energy exploration, energy production, energy transport, and/or usage. Such data is often processed and stored using hardware and software that is domain specific. For example, the hardware and software may be custom-built or specialized for applications within the energy industry. However, it can be challenging to provide this data to other computing devices (e.g., a server hosting a cloud service), and to integrate services provided by such computing devices (e.g., data processing, storage, and policy management) with a company's existing domain-specific computing infrastructure.

In some examples, energy-related data that is produced at an energy production facility can be considered sensitive and subject to export controls. For example, seismic data collected as part of oil exploration may be subject to data residency rules in a jurisdiction where the data is collected.

Accordingly, per the rules and regulations of the host jurisdiction, the seismic data may not be transmitted to a cloud server that is not located within the borders of that jurisdiction.

Additionally, and as introduced above, energy-related datasets can be large. For example, seismic data can occupy petabytes of storage. However, delays in accessing such data (e.g., due to network latency) can be detrimental for visualization and other compute workloads. In some areas, such as remote locations with little communication infrastructure, it can be challenging to transmit and receive data with low latency (e.g., less than 50 ms) from a cloud data center. Similarly, it can be challenging to transmit data in real time to the cloud due to the large volume of data. For example, an energy facility may generate 10-1000 GB of data per second, which can surpass bandwidth availability, thereby preventing real-time data transmission. Further, some energy facilities operate in remote locations, which may be far offshore, deep underwater, or a deserted region of land. In some examples, these facilities are not connected to the internet or the cloud, or connect intermittently (e.g., once per month).

In some examples, existing energy-related facilities attempt to address some of the above-identified issues by providing cloud-independent data storage and computing resources on premises. However, such cloud-independent on-premises deployments of computing resources has led to the development of a fragmented ecosystem of data types, data formats, tools and services, each being siloed at the facility of the energy producer. This fragmentation tends to increase the cost and complexity of storing and processing energy data, increase the latency of transmitting and processing energy data, and potentially force companies to create custom tools for converting and interfacing between different data types, formats, applications, and devices, increasing the cost and development time for projects. On-premises, cloud-independent computer systems are especially challenging for integrated energy companies that engage in a combination of upstream, midstream, and downstream activities, and/or energy companies that utilize a variety of energy sources.

The present disclosure addresses the dual needs for on-premises storage and efficient central management. The example computing systems described herein relate to processing energy-related data in a hybrid cloud environment comprising a cloud-service-managed control plane and a data plane utilizing local compute resources and storage located on-premises at an energy production or distribution facility. Briefly, a machine learning function is trained using a plurality of energy-related training data pairs comprising remote data accessible by a remote server computing system. The trained machine learning function is deployed to the one or more of the local edge computing device and the local on-premises computing device via the cloud service data plane. The machine learning function is configured to predict a classified label for restricted energy-related data that is restricted by the cloud-service-managed control plane to one or more of the local edge computing device and the local on-premises computing device.

In other examples, a computing system receives a trained query engine from a remote server computing system. The trained query engine is configured to parse and execute a query on restricted energy-related data that is restricted by the cloud-service-managed control plane to one or more of the local edge computing device and the local on-premises computing device.

Advantageously, in the hybrid cloud environment, local compute and storage resources (e.g., hardware that was purchased and previously managed by an energy company) are managed by a cloud service provider, providing uniformity across the data plane. Cloud service functions implemented at a remote cloud server can also be deployed to the network edge and local resources, allowing clients to specify what workloads are run at the cloud, the edge, or locally, based on latency, bandwidth, sovereignty, connectivity, or other constraints. New configurations, applications, and updates are also easily deployable in a uniform manner across the hybrid cloud environment.

FIG. 1 shows one example of a hybrid cloud environment 100. The hybrid cloud environment 100 comprises a remote server computing system 102, a local edge computing device 104, and local compute resources and storage in the form of one or more computing devices 106 located on-premises at an energy production or distribution facility 108. In some examples, the facility 108 comprises an exploratory oil well site. Other examples of facilities include, but are not limited to, an offshore platform, a pipeline, a wind farm, a solar farm, a terminal, a power station, and a facility where energy is consumed (e.g., a data center, a manufacturing facility, or a residential development).

In the example depicted in FIG. 1, the local edge computing device 104 and the one or more computing devices 106 are located on-premises at the facility 108, and the remote server 102 is located at a different facility. As one non-limiting example, the local edge computing device 104 and the one or more computing devices 106 may be located at a first facility, such as an oil exploration facility, in a first jurisdiction, such as Nigeria, and the remote server 102 may be located at a data center in a second jurisdiction, such as the United States. In other examples, the local edge computing device 104 and the one or more computing devices 106 are located at different facilities. For example, the one or more computing devices 106 may be located at an offshore platform, and the local edge computing device 104 is located on another vessel (e.g., another platform or a supply/transport ship).

The local edge computing device 104 and the one or more computing devices 106 are connected by a local area network (LAN) 110. The local edge computing device 104 is connected to the remote server 102 by a wide area network (WAN) 112, such as the internet. The local edge computing device 104 is a computing device having a position on a network topology between the LAN 110 and the WAN 112. Advantageously, and as described in more detail below, the local edge computing device 104 provides at least a portion of the functionality of the remote server 102 at the local network level, such as providing cloud-service-managed data governance, storage, and processing.

It will also be appreciated that, in some examples, aspects of the local edge computing device 104, the on-premises computing devices 106, and/or the remote server 102 are provided by two or more devices. For example, aspects of the remote server 102 may be implemented at a plurality of servers at one or more data centers. The on-premises computing devices 106 may comprise a cluster of a plurality of connected computing devices. It will also be appreciated that, in some examples, the local edge computing device 104, the on-premises computing devices 106, and/or the remote server 102 comprise real devices, virtual devices, or a combination of real and virtual devices. In some examples, the local compute resources and storage comprise one or more physical computing devices 142 running a cluster 144 comprising a plurality of virtual machines (VMs) 146.

In some examples, aspects of the remote server 102 and/or the local edge computing device 104 are provided on a software-as-a-service (SaaS) basis or a hardware-as-a-service (HaaS) basis, in which the underlying computing hardware is housed and managed by a service provider. In contrast, the one or more on-premises computing devices 106 comprise hardware that was originally independent of the cloud service ecosystem, such as legacy hardware owned by an energy company, housed and managed at the facility 108. Advantageously, such hardware is integrated into the hybrid cloud environment 100, providing uniform management and preventing fragmentation of the computing ecosystem.

The one or more on-premises computing devices 106 comprise a container platform 114, such as KUBERNETES. The container platform 114 comprises a system for deploying, scaling, and managing containerized applications. The remote server 102 and the local edge device 104 are compatible with the container platform 114, thus the container platform 114 is a foundation for applications and services to be deployed across the hybrid cloud environment 100.

The remote server computing system 102, the local edge computing device 104, and the one or more on-premises computing devices 106 each have a processor and associated memory storing instructions executable by the processor. Additional details regarding the components of the remote server computing system 102, the local edge computing device 104, the one or more on-premises computing devices 106, the LAN 110, and the WAN 112 are provided below with reference to FIG. 13.

The hybrid cloud environment 100 also comprises a cloud-service-managed control plane 116 and a cloud service data plane 118 utilizing the local compute resources and storage provided by the one or more on-premises computing devices 106. The control plane 116 controls how data is routed within the hybrid cloud environment 100. For example, data routing table(s) are created in the control plane 116 that define how data is routed between the server 102, the edge device 104, and/or the on-premises computing device(s) 106. The data plane 118 comprises the data that is routed between the server 102, the edge device 104, and/or the on-premises computing device(s) 106, following one or more paths established at the control plane 116. The cloud-service-managed control plane 116 and the data plane 118 span the remote server computing system 102, the local edge computing device 104, and the local compute resources and storage provided by the one or more local on-premises computing devices 106. In this manner, the cloud-service-managed control plane 116 and the data plane 118 facilitate data transmission between the server 102, the edge device 104, and/or the on-premises computing device(s) 106.

The remote server computing system 102 is configured to present a user interface 120 with a plurality of deployment configuration options 122. In some examples, and as described in more detail below with reference to FIGS. 2-8, the user interface is a graphical user interface (GUI). In other examples, the user interface comprises any other suitable type of interface. Another example of a suitable interface is a command line/text interface.

FIGS. 2-9 show an example of a GUI 200 for configuring a hybrid cloud environment, such as the hybrid cloud environment 100 of FIG. 1. In some examples, the GUI 200 serves as the user interface 120 of FIG. 1.

Figure 2:
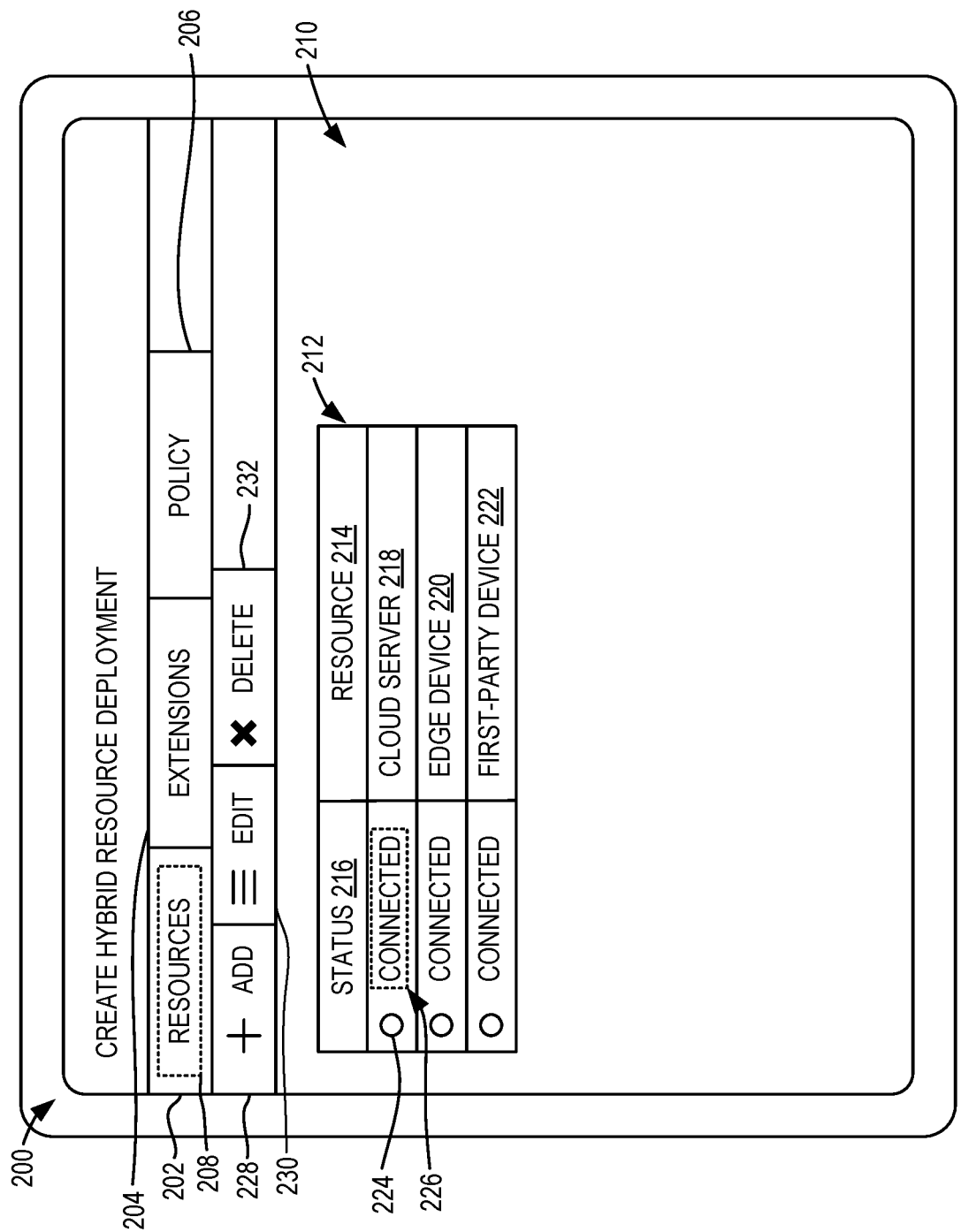
FIG. 2 shows an example of a graphical user interface (GUI) that can be implemented to configure the hybrid cloud environment of FIG. 1.

The GUI 200 comprises a first "RESOURCES" tab 202, a second "EXTENSIONS" tab 204, and a third "POLICY" tab 206. With reference now to FIG. 2, the "RESOURCES" tab 202 is selected, as indicated by dashed box 208. Accordingly, the GUI 200 displays a resource page 210 comprising a table 212. The table 212 comprises a "RESOURCE" column 214 listing a plurality of computing resources making up the hybrid cloud environment, and a "STATUS" column 216 indicating a status of each computing resource. In the example depicted in FIG. 2, the hybrid cloud environment comprises a cloud server 218, an edge device 220, and a first-party computing device 222 located on-premises at an energy-related facility.

The table 212 further comprises a status indicator 224 for each of the resources in the column 214 configured to provide a graphical representation of a status of each resource. For example, the status indicator 224 may be colored green to indicate that the resource is connected to a cloud service platform, amber to indicate that the resource is configured, but not presently connected, and red to indicate a configuration error. The column 214 further comprises a text indicator 226 of the status (e.g., "CONNECTED"). In the example depicted in FIG. 2, the cloud server 218, the edge device 220, and the first-party computing device 222 are each connected to the cloud service platform.

The GUI 200 further comprises an "ADD" button 228 that is user-selectable to add a new resource to the hybrid cloud environment. An "EDIT" button 230 is user-selectable to edit a name or one or more configuration parameters of a computing resource. In addition, the GUI 200 comprises a "DELETE" button 232 that is user-selectable to remove one or more computing resources from the hybrid cloud environment. Each resource may have an associated IP address, and in one example, a routing table of IP addresses may be generated for use as the control policy 130 discussed below, based on the user input into in GUI 200.

Figure 3:
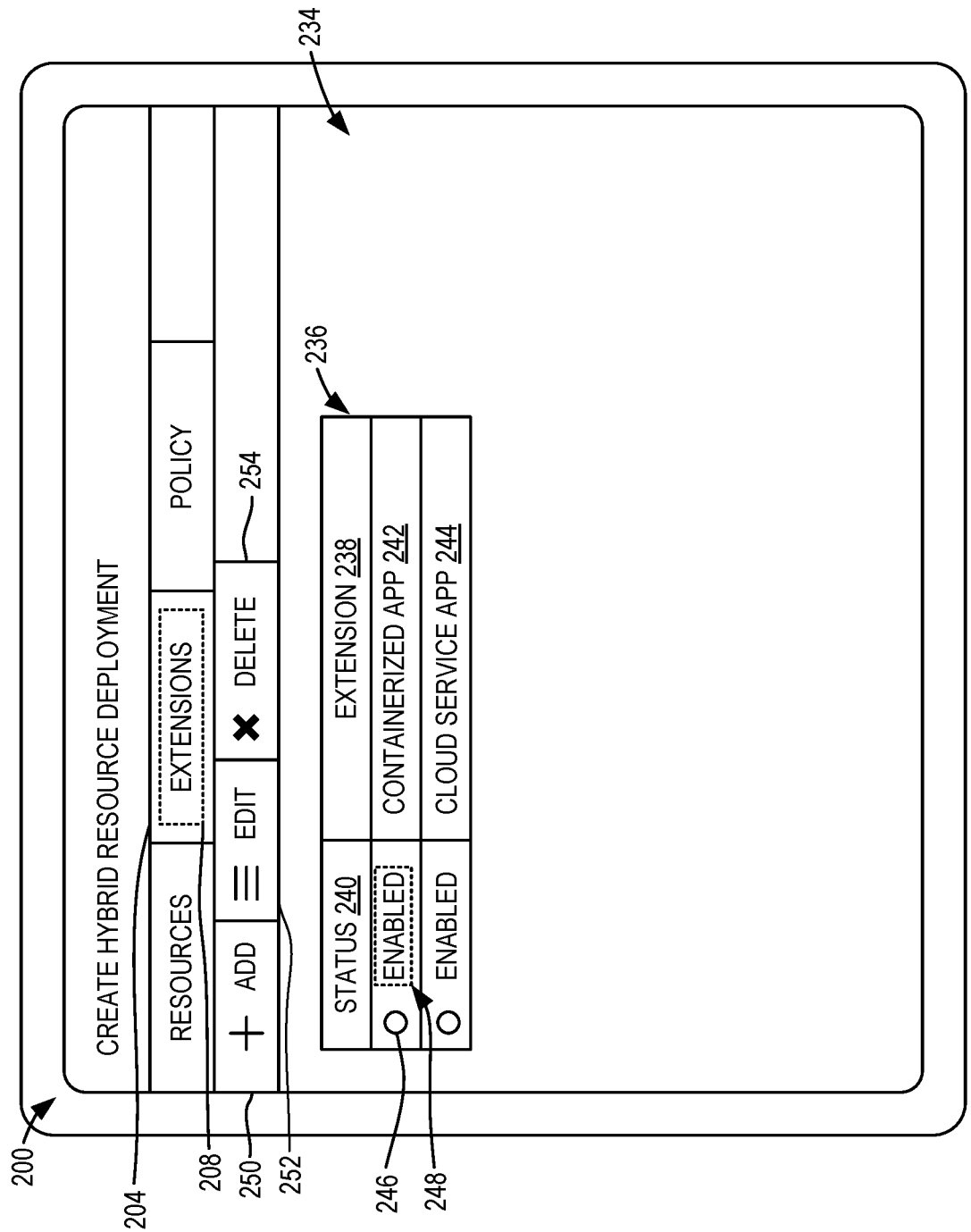
FIG. 3 shows additional example features of the GUI of FIG. 2.

FIG. 3 shows the GUI 200 with the "EXTENSIONS" tab 204 selected, as indicated by the dashed box 208. The GUI 200 is displaying an extensions page 234 comprising an extension table 236. The extension table 236 comprises an "EXTENSION" column 238 listing one or more applications that can be deployed in the hybrid cloud environment, and a "STATUS" column 240 indicating a status of each computing resource. In the example depicted in FIG. 3, the extensions include a containerized application 242 implemented at the first-party computing device 222 using a cloud-service-compatible container platform (e.g., the container platform 114 of FIG. 1). The extensions further include a cloud service application 244 implemented at the cloud server 218 and the edge device 220. By integrating the containerized application 242 and the cloud service application 244 in the extensions table 236, the extensions are deployable at any location in the hybrid cloud environment (e.g., at the cloud server 218, the edge device 220, and/or the first-party computing device 222).

The extension table 236 further comprises a status indicator 246 for each of the extensions in the column 238 configured to provide a graphical representation of a status of each resource. The column 214 further comprises a text indicator 248 of the status (e.g., "ENABLED"). In the example depicted in FIG. 3, the containerized application 242 and the cloud service application 244 are enabled for use in the hybrid cloud environment.

The GUI 200 further comprises, in the extensions page 234, an "ADD" button 250 that is user-selectable to add a new extension to the hybrid cloud environment. An "EDIT" button 252 is user-selectable to edit a name or one or more configuration parameters of an extension. In addition, the GUI 200 comprises a "DELETE" button 254 that is user-selectable to remove one or more extensions from the hybrid cloud environment.

With reference again to FIG. 1, the remote server computing system 102 is configured to receive a user input of one or more of the deployment configuration options 122. As described in more detail below with reference to FIGS. 4-8, the deployment configuration options 122 include compute configuration options 124 and data storage configuration options 126 for energy-related data 128 within the hybrid cloud environment 100. A data control policy 130 is generated that provides cloud-service-managed governance over at least a portion of the data plane 118 using the one or more user-input deployment configuration options. The data control policy 130 is provided to the local edge computing device 104 and/or the local compute resources via the cloud-service-managed control plane 116, and may include a routing table of IP addresses of the local edge device 104, on-premises computing devices 106, and remote server 102, for example. The cloud-service-managed control plane 116 is configured to enforce the data control policy 130 by subjecting at least a portion 132 of the energy-related data 128 to a data transmission restriction or a local storage restriction.

As described in more detail below, the data transmission restriction or local storage restriction may be implemented as a separate routing table in the control policy 130 that is different than a routing table that is applied to unrestricted data. In this manner, the routing tables are configured to specify allowed data paths for restricted data and unrestricted data in accordance with the user-input deployment configuration options 122. For example, an unrestricted data routing table may allow the unrestricted data 136 to be transmitted between any of the remote server 102, the edge device 104, and the one or more on-premises computing devices 106. However, a restricted data routing table may allow the restricted data 132 to be transmitted between any of the one or more on-premises computing devices 106, but not to the remote server 102 and/or the local edge device 104.

With reference now to FIGS. 4-9, the "POLICY" tab 206 in the GUI 200 is selected, as indicated by the dashed box 208. Accordingly, the GUI 200 displays a plurality of deployment configuration options, including compute configuration options and data storage configuration options that can be used to formulate the data control policy 130 of FIG. 1.

Figure 4:
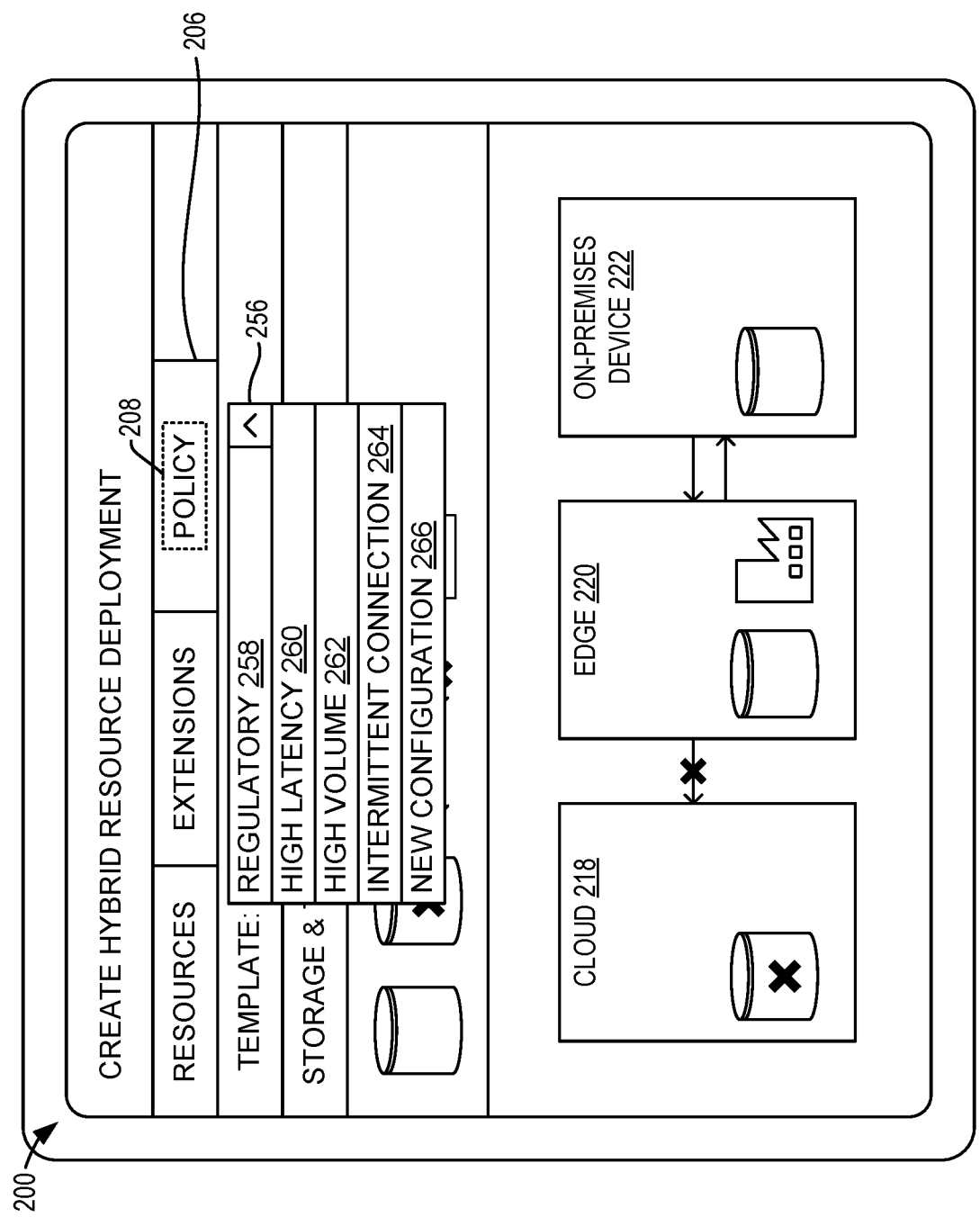
FIG. 4 shows an example policy template menu in the GUI of FIG. 2.

In some examples, the deployment configuration options are provided in the form of a policy template. As depicted in FIG. 4, the GUI 200 comprises a policy template menu 256. The policy template menu 256 comprises a plurality of policy templates, including a regulatory data control template 258, a high-latency template 260, a high-volume template 262, and an intermittent connection template 264. The menu 256 also comprises a blank template 266 labeled "NEW CONFIGURATION" for a user to provide a new, custom set of configuration options.

In some examples, and as introduced above, some energy-related data (e.g., seismic data) is considered sensitive data and is subjected to data residency rules in certain jurisdictions. Accordingly, the regulatory data control template 258 is populated with deployment configuration options that comply with such data residency and control rules. These may, for example, be implemented via a restricted routing table with only on-premises IP address entries as discussed above.

Figure 5:
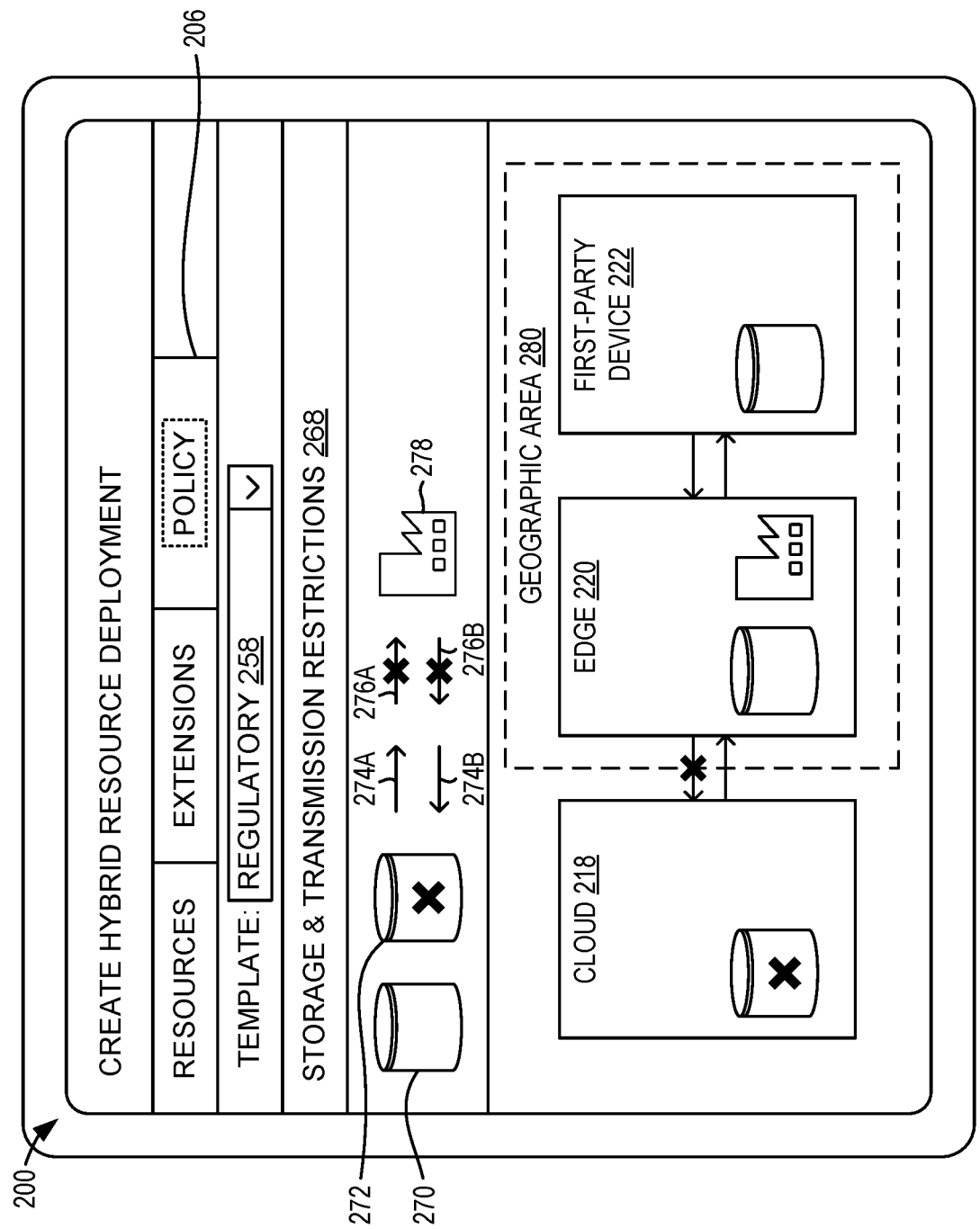
FIG. 5 shows an example of a regulatory data control policy template in the GUI of FIG. 2.

FIG. 5 shows the regulatory data control template 258. As shown in FIG. 5, the GUI 200 comprises a menu of user-selectable storage and transmission restriction options 268, and a graphical representation of the cloud device 218, edge device 220, and first-party device 222. The cloud device 218 can serve as the remote server 102 of FIG. 1, the edge device 220 can serve as the local edge device 104 of FIG. 1, and the first-party device 222 can serve as the one or more on-premises computing devices 106 of FIG. 1.

The menu 268 includes a user-selectable storage icon 270, which is configured to be selected and placed inside one or more of the graphical representations of the cloud device 218, the edge device 220, and/or the first-party device 222 to specify one or more locations at which data storage is permitted. A user-selectable storage restriction icon 272 is configured to be selected and placed inside one or more of the graphical representations of the cloud device 218, the edge device 220, and/or the first-party device 222 to specify one or more locations at which data is not permitted to be stored. Data transmission icons 274A and 274B are configured to be placed between two of the graphical representations of the cloud device 218, the edge device 220, and/or the first-party device 222 to specify between which devices, and in which direction, data is permitted to be transmitted. Transmission restriction icons 276A and 276B are configured to be placed between two of the graphical representations of the cloud device 218, the edge device 220, and/or the first-party device 222 to specify between which devices, and in which direction, data transmission is not permitted. The menu 268 further comprises a processing icon 278 configured to be selected and placed inside one or more of the graphical representations of the cloud device 218, the edge device 220, and/or the first-party device 222 to specify one or more locations at which data processing occurs.

In the regulatory template 258, energy-related data is stored on one or more storage devices located within a geographic area 280 (e.g., within a country's borders). For example, as shown in FIG. 5, data is permitted to be stored on the edge device 220 and the first-party device 222, which are located within the geographic area 280. The energy-related data is also subject to a data transmission restriction within the geographic area. For example, as shown in FIG. 5, data is permitted to be transmitted between the edge device 220 and the first-party device 222, but is not permitted to be transmitted out of the geographic area 280 to the cloud server 218. In some examples, data is permitted to be transmitted from the cloud server 218 to the edge device 220, for example to provide core platform and policy management services to devices within the geographic area 280. The geographic area restriction may be implemented by restricting transfer to IP addresses within the geographic area using a routing table, for example.

Figure 6:
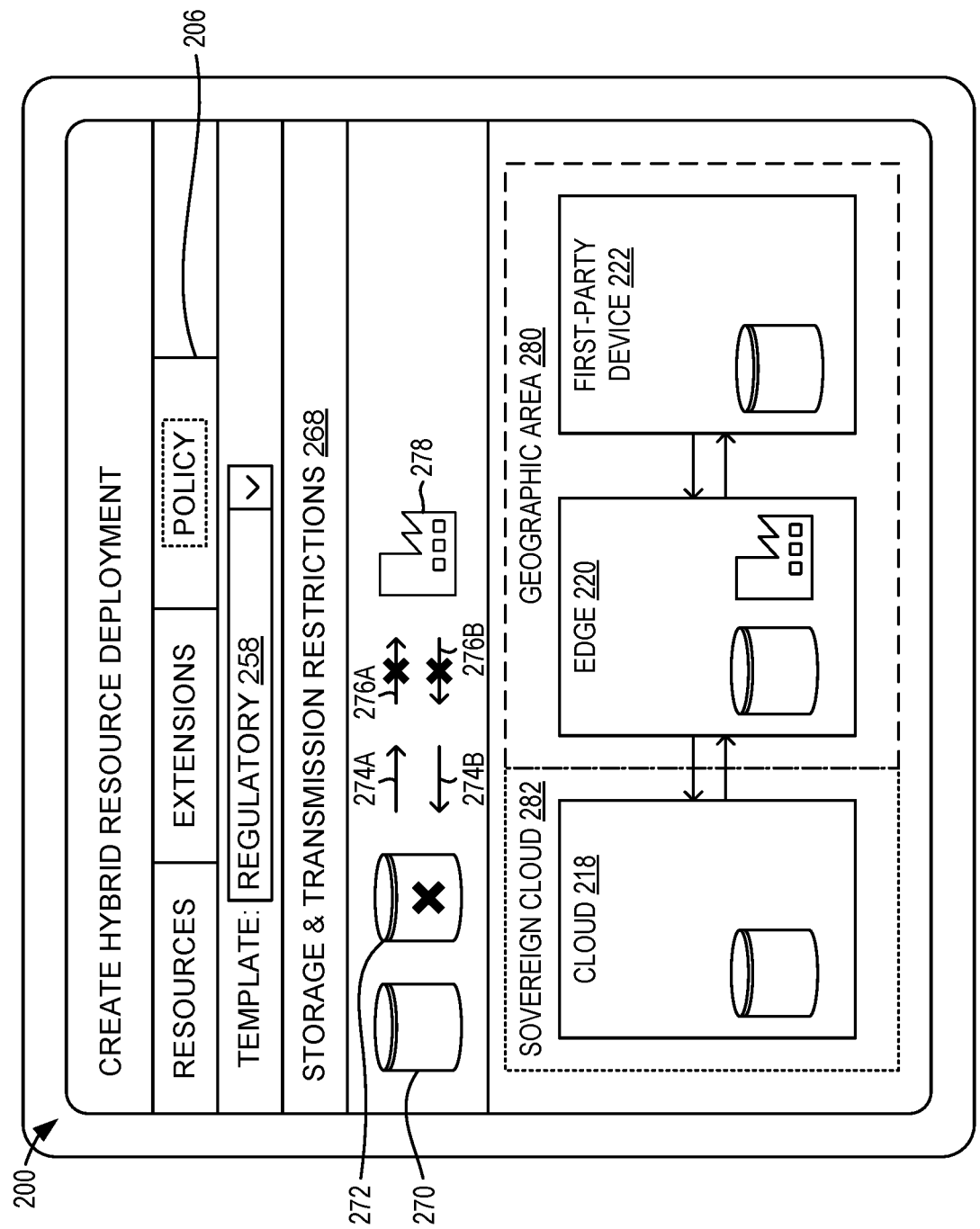
FIG. 6 shows another example of a regulatory data control policy template in the GUI of FIG. 2.

With reference now to FIG. 6, the cloud server 218 is optionally located in a sovereign cloud. The regulatory compliance template 258 permits access to the energy-related data via the sovereign cloud 282. For example, as shown in FIG. 5, data is permitted to be transmitted between the edge device 220 and the cloud device 218, and the data is permitted to be stored on the cloud device 218 when the cloud device 218 is in the sovereign cloud. For example, and with reference again to FIG. 1, based on determining that the remote server computing system 102 is located in a sovereign cloud, the remote server 102 is configured to receive, via the data plane 118, at least the portion 132 of the energy-related data 128 subject to the data transmission restriction or the local storage restriction.

With reference again to FIG. 5, the edge device 220 comprises a high-performance edge server that is connected to the first party device 222 via a high-throughput network. Accordingly, the regulatory template 258 indicates that data processing occurs at the edge device 220. In this manner, the edge device 220 provides data storage, API access, and processing services (e.g., artificial intelligence (AI) services) in the cloud environment.

In some examples, and as introduced above, network latency is detrimental for data visualization and other compute workloads. For example, seismic data can have a size on the order of petabytes, and visualization and other jobs lag when network latency is greater than a threshold latency (e.g., 50 ms). Accordingly, and as illustrated in the example of FIG. 7, the high-latency template 260 is populated with deployment configuration options that mitigate the effects of high-latency network(s).

The high-latency template 260 is implemented and enforced by the cloud-service-managed control plane based upon determining that a network connection between the remote server computing system and the local edge computing device has a latency that is greater than or equal to a threshold latency. The threshold latency may comprise any suitable latency defined by the user. In some examples, the threshold latency is 50 ms.

Figure 7:
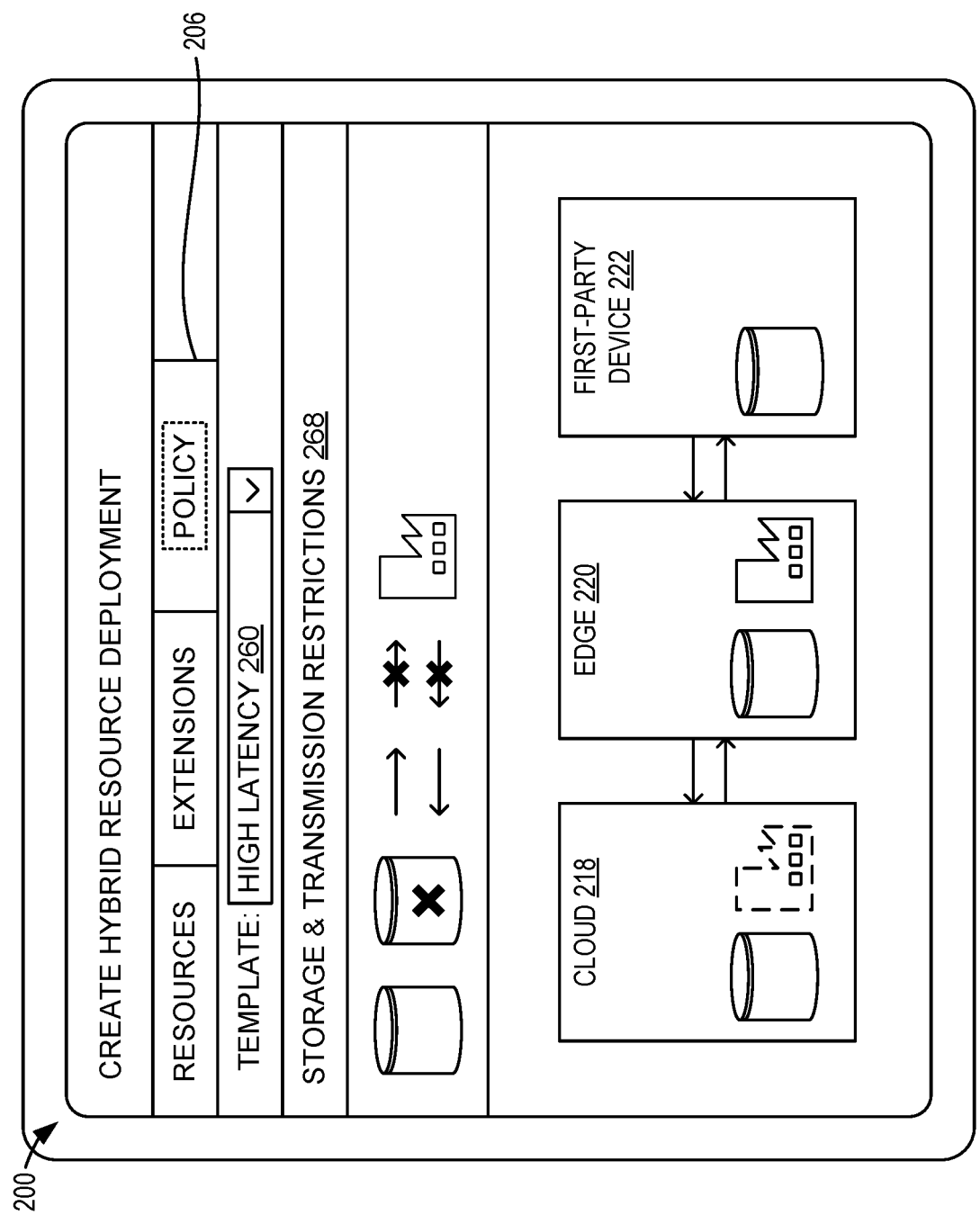
FIG. 7 shows an example of a high-latency network data control policy template in the GUI of FIG. 2.

As shown in FIG. 7, the high-latency template 260 specifies that the energy-related data is processed at the local edge computing device 220, as the latency of the network connection between the remote server computing system and the local edge computing device is too high for applications to be executed in real time using the energy-related data. There are no data storage restrictions.

As indicated in FIG. 7, at least a portion of data processing optionally occurs at the cloud 218. For example, data can be streamed over the high-latency network and stored or cached at the cloud device 218 for non-real-time processing (e.g., AI training and inference).

Figure 8:
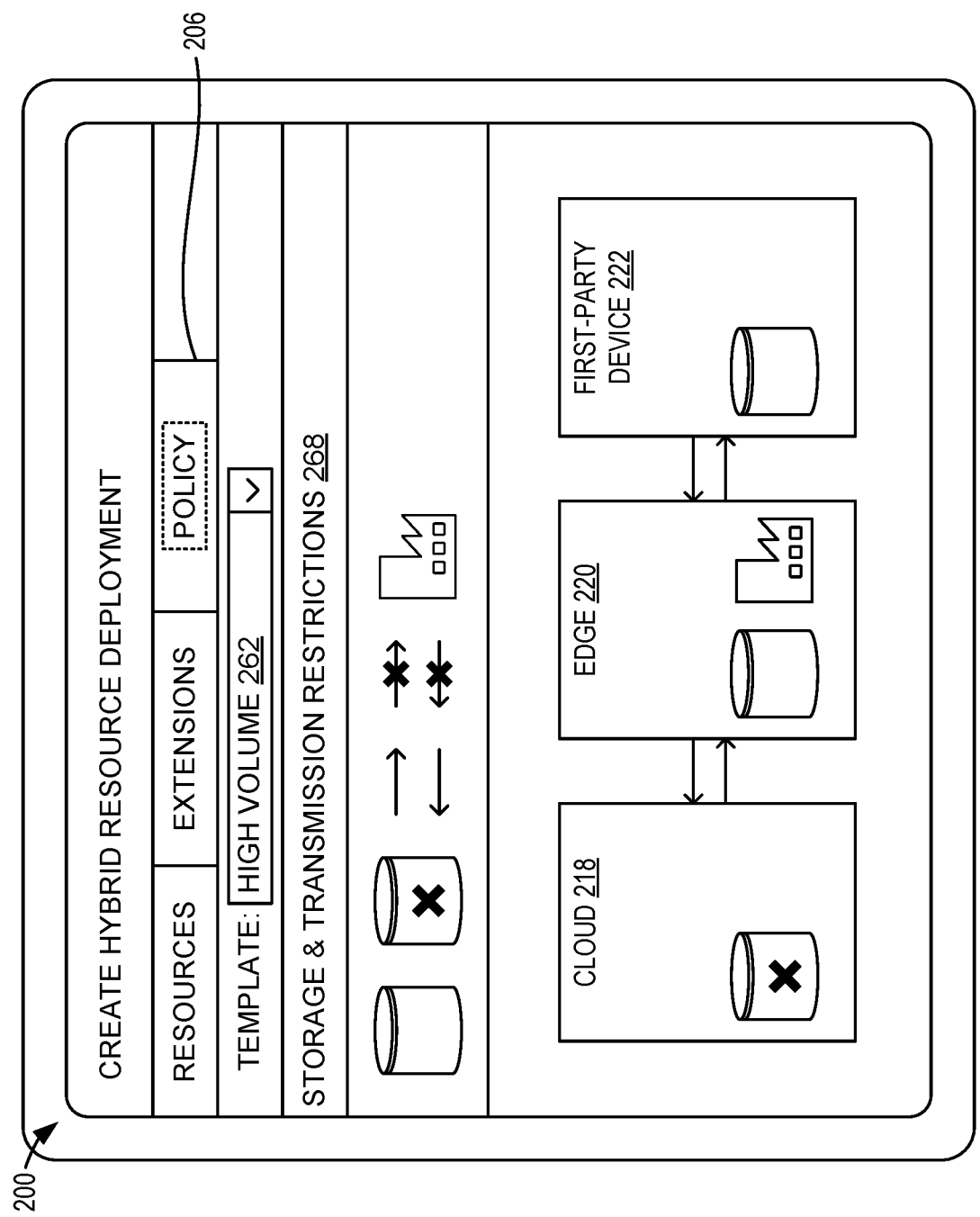
FIG. 8 shows an example of a high-data-volume data control policy template in the GUI of FIG. 2.

With reference now to FIG. 8, and as introduced above, in some examples, large amounts of data are generated at the edge device in the range of 10-1000 GB/second, for each data collection site. This surpasses real-time network bandwidth between the edge device 220 and the cloud 218, such that the cloud 218 cannot process the data in real time. Accordingly, the user interface 200 is populated with the high-data-volume template 262, and the cloud service data plane is configured to enforce the high-data-volume template based on determining that the data volume of the energy-related data is greater than or equal to a threshold data volume. The threshold data volume may comprise any suitable latency. In some examples, the threshold data volume is in the range of 10-15 terabytes (TB) streaming data per day per site.

Accordingly, the high-data-volume template 262 specifies that the energy-related data is stored and processed at the local edge computing device, and is not stored at the cloud device 218. In other examples, the data is consolidated at the edge 220 before being sent to the cloud 218 in non-real time (e.g., over the network or via an offline databox transfer device). In this manner, some data processing and storage can take place at the cloud 218 (e.g., AI and other high-performance computing applications).

Figure 9:
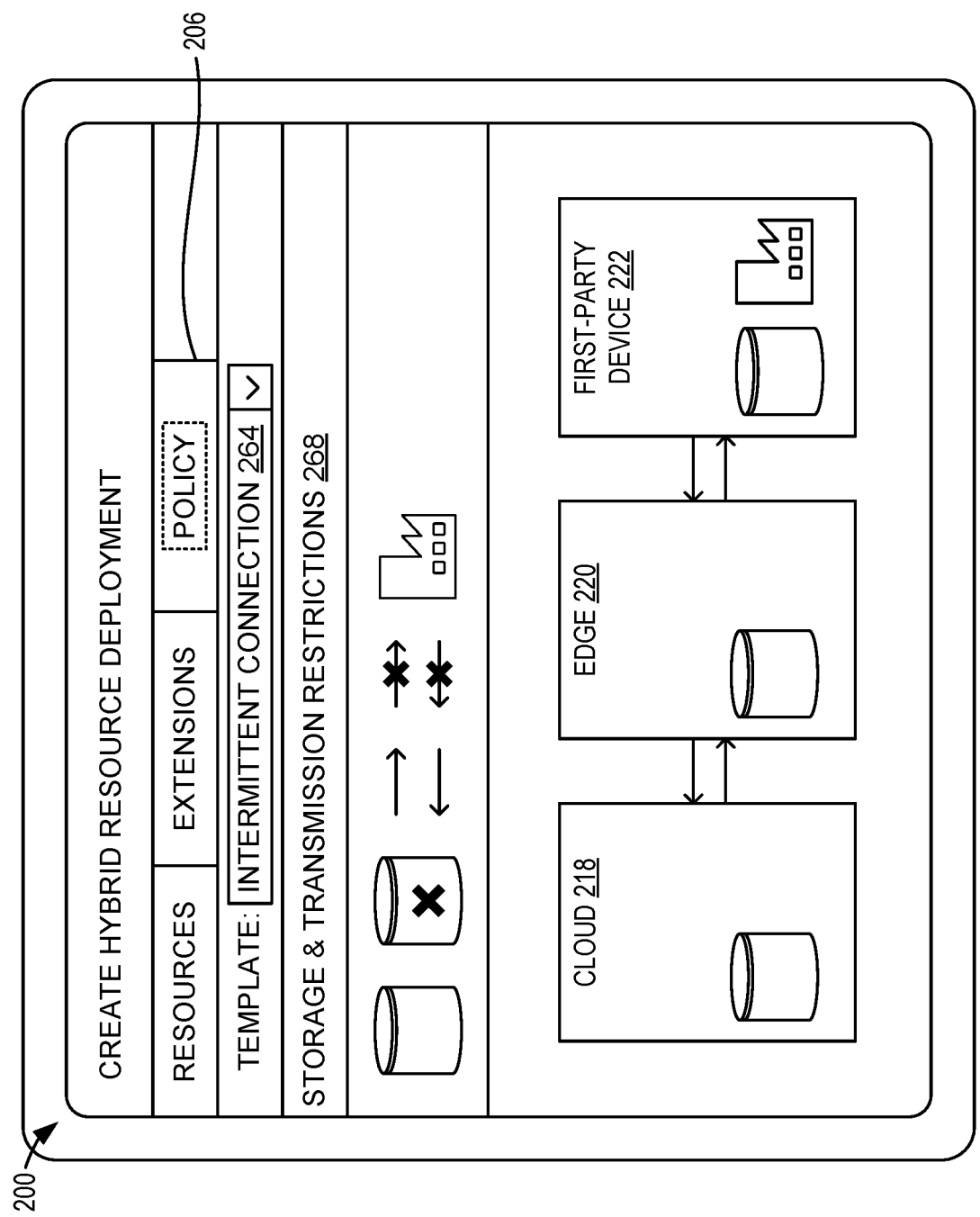
FIG. 9 shows an example of an intermittent connection data control policy template in the GUI of FIG. 2.

With reference now to FIG. 9, and as introduced above, some facilities operate in remote locations that are not connected to the Internet or the cloud 218 all the time. Based upon determining that a network connection between the remote server computing system and the local compute resources is intermittent, the user interface 200 is populated with intermittent connection template 264 and the intermittent connection template 264 is enforced by the cloud-service-managed control plane. The intermittent connection template 264 specifies that the energy-related data is cached and processed at the local compute resources and storage (e.g., at the first-party device 222). Data can be transmitted to the edge 220 and/or cloud 218 when a network connection becomes available, or via an offline databox transfer device. Other than caching, the data can be stored at any available location. It will also be appreciated that, in other examples, the energy-related data is cached and processed at the local edge device 220 when a high-throughput connection is available between the edge 220 and the first-party device 222, but not between the edge 220 and the cloud 218.

With reference again to FIG. 1, The local edge computing device 104 and/or the local compute resources are configured to receive the data control policy 130 from the remote server computing system 102 via the cloud-service-managed control plane 116. In some examples, the data control policy 130 comprises one or more files in a distributed version control repository (e.g., a Git repository). By housing the data control policy 130 in the distributed version control repository, modifications to the data control policy 130, updates, and rollbacks can be implemented uniformly across the hybrid cloud environment 100.

In the example of FIG. 1, the one or more on-premises computing devices 106 receive the energy-related data 128. In some examples, the energy-related data 128 is received from one or more sensors, such as geophones, temperature sensors, or pressure sensors. In other examples, the energy-related data 128 is generated at the one or more on-premises computing devices 106.

The one or more on-premises computing devices 106 are configured to enforce the data control policy 130 by subjecting at least a portion of the energy-related data 128 to a data transmission restriction or a local storage restriction. It will also be appreciated that, in other examples, the energy-related data 128 is additionally or alternatively received by the local edge device 104. In such examples, enforcement of the data control policy 130 and following processing are implemented at the edge device 104.

When a subset of the energy-related data 128 is subject to the data transmission restriction or the local storage restriction, the restricted subset 132 of the energy-related data 128 is stored at an on-premises storage device 134, and is not transmitted to the remote server 102 or the local edge device 104. In contrast, when a subset of the energy-related data 128 is not subject to the data transmission restriction or the local storage restriction, the unrestricted portion 136 of the energy-related data 128 is provided to the remote server 102 and the local edge device 104 via the data plane 118.

The data plane 118 is also used to deploy one or more cloud service functions 138 to the local compute resources. The local edge device 104 and/or the one or more on-premises computing devices 106 are configured to receive the one or more cloud service functions 138 from the remote server computing system 102 via the data plane 118. In this manner, the one or more cloud service functions 138 can be executed at the local edge device 104 and/or the one or more on-premises computing devices 106.

The one or more cloud service functions 138 are configured to process at least the portion 132 of the energy-related data 128 that is subject to the data transmission restriction or the local storage restriction. In this manner, and as described in more detail below, the restricted data 132 is processed at on-premises at the facility 108, enabling compliance with regulatory data controls and/or preventing data processing delays related to network latency, bandwidth, and connectivity.

In the example of FIG. 1, the one or more on-premises computing devices 106 are configured to process at least the restricted portion 132 of the energy-related data 128 using the one or more cloud service functions 138 to extract one or more features 140 from at least the restricted portion 132 of the energy-related data 128. In some examples, the one or more cloud service functions 138 are configured to process the restricted portion 132 of the energy-related data 128 at the one or more on-premises computing devices 106 and/or the local edge device 104, and any unrestricted data 136 is processed at the remote server 102. In this manner, at least a portion of the data processing can be offloaded to the remote server 102.

In other examples, all of the energy-related data 128 is processed locally at the one or more on-premises computing devices 106 and/or the local edge device 104. In this manner, the energy-related data can be processed using the cloud service functions 138 even when restricted to the local facility 108 by the control policy 130.

In some examples, the one or more features 140 extracted from the energy-related data 128 comprise inferences drawn from at least a portion of the energy-related data 128 (e.g., using AI). In other examples, the one or more features 140 comprise any other suitable data features. Some examples of suitable features include, but are not limited to, search results output in response to a search query, descriptive statistics, data visualizations, and a reduced-dimensionality version of the restricted data 132. Additional details regarding the data processing are provided in more detail below with reference to FIGS. 10-11.

Figure 10:
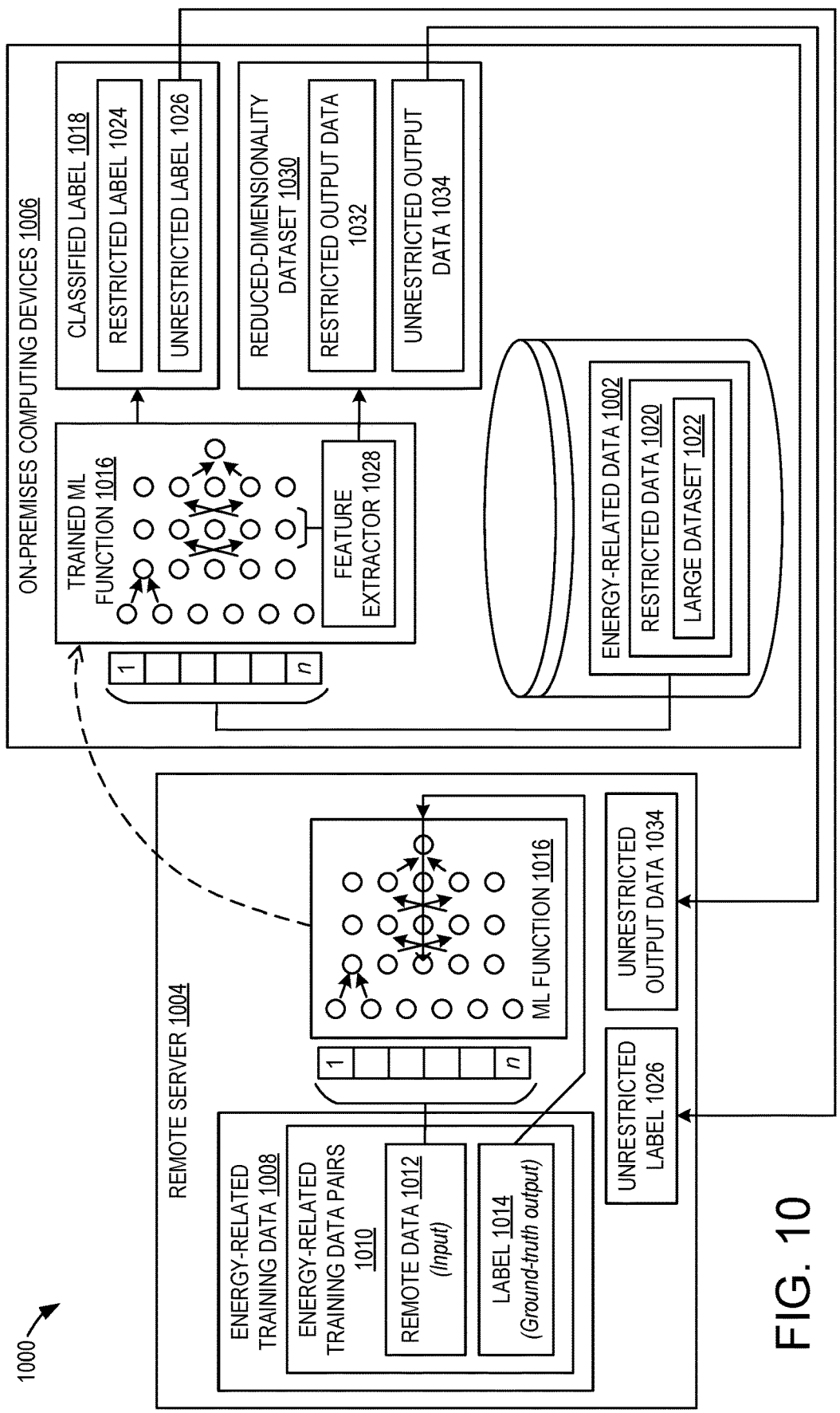
FIG. 10 shows another example of a hybrid cloud environment including an example deployment of a machine learning function.

FIG. 10 shows another example of a hybrid cloud environment 1000 for processing energy-related data 1002. The hybrid cloud environment 1000 includes a remote server 1004. The remote server 1004 can serve as the remote server 102 of FIG. 1. The hybrid cloud environment 1000 further comprises one or more on-premises computing devices 1006. The one or more on-premises computing devices 1006 can serve as the one or more on-premises computing devices 106 of FIG. 1.

The remote server 1004 is configured to receive energy-related training data 1008, including a plurality of energy-related training data pairs 1010. Each energy-related training data pair 1010 includes, as input, remote data 1012 accessible by the remote server computing system 1004. In some examples, the remote data 1012 is an unrestricted subset of the energy-related data 1002. In other examples, the remote data 1012 comprises a dataset that is not derived from the energy-related data 1002, but which shares similar data characteristics. For example, the energy-related data 1002 and the remote data 1012 may each comprise seismic imaging datasets, but each dataset may be obtained from a different geographic location.

The energy-related training data pairs 1010 also include a label 1014 serving as ground-truth output. The remote server computing system 1004 is configured to train a machine learning (ML) function 1016 using the plurality of training data pairs 1010. The machine learning function 1016 is trained to predict a classified label 1018 for restricted energy-related data 1020 that is restricted by the cloud service management control plane to one or more of the local edge computing device and the local on-premises computing device. While the present example refers to the one or more on-premises computing devices 1006, it will also be appreciated that the machine learning function 1016 may be trained to classify data located at an edge computing device (e.g., the local edge device 104 of FIG. 1).

It will be appreciated that the particular set of features included in the energy-related training data pairs 1010 to train the machine learning function 1016 will be included for each and every training session, and will also be included in an input vector at run time, with each input indicated on a normalized scale of zero to one. When a particular feature is present in one session, but is not present in another session, it will be indicated as zero when it is not present.

In some examples, the machine learning function 1016 includes a neural network. The training may take place using any suitable method(s), such as by using backpropagation with gradient descent. As the neural network is trained, an input vector (e.g., a vector comprising a normalized form of the unrestricted data 1012) and matched ground truth labels (e.g., the label 1014), which can be classifications or scalar values, are applied to an input layer and an output layer respectively, and the weights in the network are computed through gradient descent and the backpropagation algorithm, for example, such that the trained neural network will properly classify (or properly value) the input vector to the matched ground truth classification or scalar value in the output layer. In other examples, another suitable AI model may be used, such as neural network of another structure, a support vector machine, etc.

The restricted energy-related data 1020 is not accessible to the remote server computing system 1004 for training due to transmission or storage restriction on the restricted data. For example, the restricted energy-related data 1020 may comprise the restricted data 132 of FIG. 1. As introduced above, in some examples, the restricted energy-related data 1020 comprises sensitive data that is not allowed to be transmitted or stored outside of a jurisdiction. In other examples, the restricted energy-related data 1020 comprises a large dataset 1022 that is challenging to transmit to the remote server 1004 due to its size or network issues between the on-premises computing device(s) 1006 and the remote server 1004. Initial training of the machine-learning function 1016 is also a computationally intensive process, which is advantageously offloaded to the remote server 1004 using the unrestricted energy-related training data 1008.

However, the trained machine learning function 1016 is deployed, via the cloud service data plane (e.g., the data plane 118) to the one or more of the local edge computing device and the local on-premises computing device. In this manner, the trained machine learning function 1016 is used to process the restricted data 1020 locally at the one or more local on-premises computing devices 1006. In some examples, adaptive learning (which may be less computationally intensive than initial training) takes place at the one or more on-premises computing devices 1006 to adapt the machine-learning function 1016 to the restricted data 1020.

In some examples, the classified label 1018 output by the machine learning function 1016 comprises a restricted label 1024 subject to a data transmission or storage restriction to the one or more on-premises computing devices 1006. Accordingly, the restricted label 1024 may not be transmitted to the remote server 1004.

In other examples, the classified label 1018 output by the machine learning function 1016 comprises an unrestricted label 1026 that is not subject to the data transmission or storage restriction. Accordingly, the unrestricted label 1026 is output to the cloud service data plane. In this manner, the remote server 1004 is configured to receive, via the cloud service data plane, the classified output of the trained machine learning function 1016.

In some examples, the one or more on-premises computing devices 1006 additionally or alternatively host a feature extractor 1028. In the example of FIG. 10, the feature extractor 1028 obtains outputs from a feature extraction layer within the machine learning function 1016. In this manner, the feature extractor 1028 can be applied to the large dataset 1022 to produce a reduced-dimensionality dataset 1030. In the example shown in FIG. 10, an input layer of the trained machine learning function 1016 comprises n neurons, which collectively receive an input vector of dimension n. The feature extractor 1028 obtains outputs from a downstream layer comprising k<n neurons. Accordingly, the reduced-dimensionality dataset 1030 has a dimensionality of k, which is less than n, and thereby occupies less storage volume than the large dataset 1022.

In other examples, the one or more on-premises computing devices comprise a feature extractor in the form of a separate AI object from the machine learning function 1016. For example, the feature extractor may comprise a convolutional neural network or a recurrent neural network having a number of output neurons that is less than a number of input neurons, thereby reducing the dimensionality of an input dataset. Further, by using a separate AI object, the feature extractor can be built or trained independent of the machine learning function 1016 (e.g., using different neuron functions, weights, or biases) to provide different outputs.

Like the classified label 1018, in some examples, the reduced-dimensionality dataset 1030 comprises restricted output data 1032 subject to a data transmission or storage restriction to the one or more on-premises computing devices 1006. In other examples, the reduced-dimensionality dataset 1030 comprises unrestricted output data 1034 that is not subject to the data transmission or storage restriction. Accordingly, the unrestricted output data 1034 is output to the cloud service data plane. In this manner, the remote server 1004 is configured to receive, via the cloud service data plane, the unrestricted output data 1034.

Figure 11:
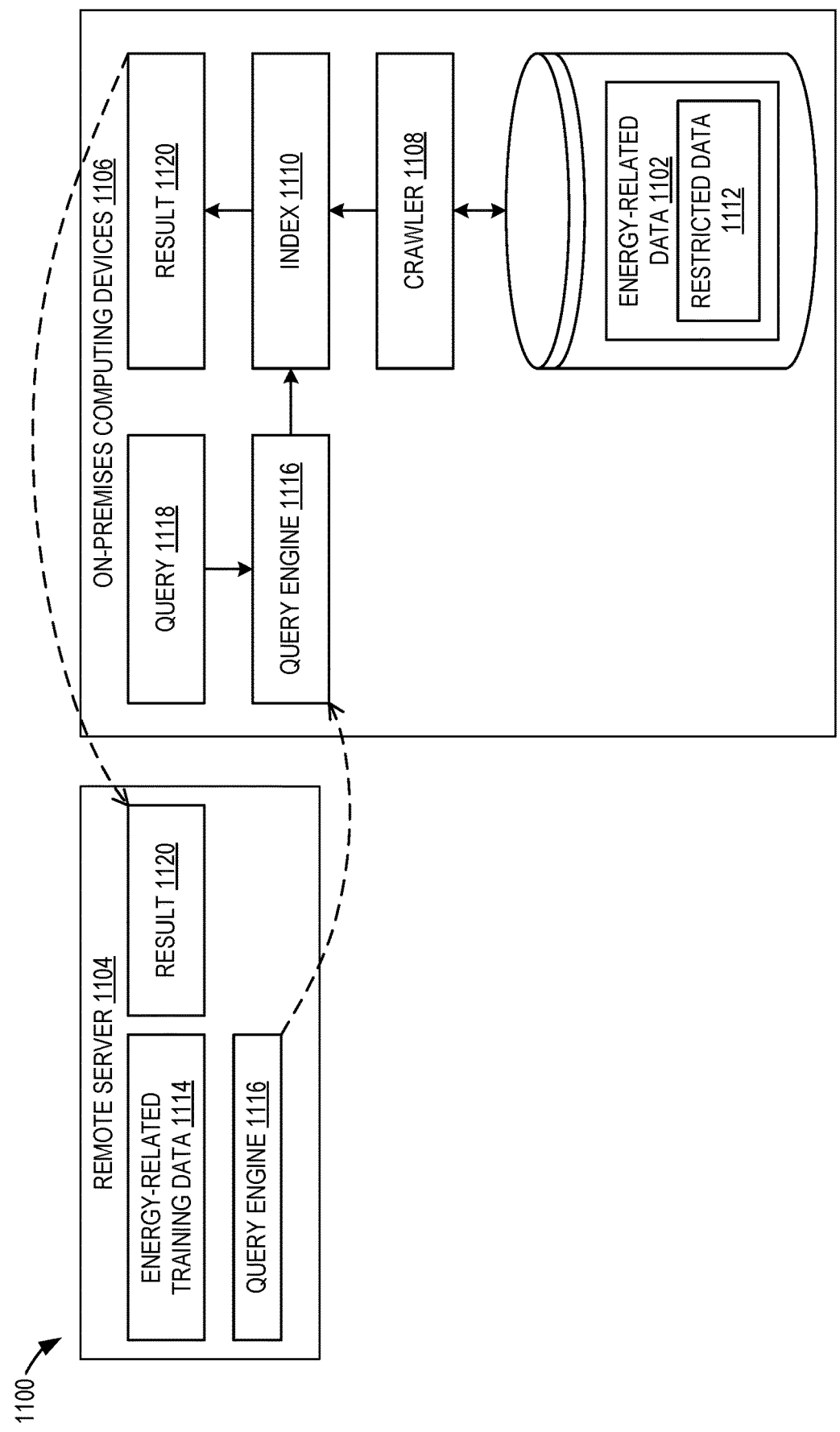
FIG. 11 shows another example of a hybrid cloud environment including an example search engine deployment.

FIG. 11 shows another example of a search engine deployment in a hybrid cloud environment 1100 for processing energy-related data 1102. Like the hybrid cloud environment 1000 of FIG. 10, the hybrid cloud environment 1100 includes a remote server 1104. The remote server 1104 can serve as the remote server 102 of FIG. 1. The hybrid cloud environment 1100 further comprises one or more on-premises computing devices 1106. The one or more on-premises computing devices 1106 can serve as the one or more on-premises computing devices 106 of FIG. 1. While the present example refers to the one or more on-premises computing devices 1106, it will also be appreciated that the search engine may be implemented at least in part using an edge computing device (e.g., the local edge device 104 of FIG. 1).

The search engine comprises a crawler 1108. The crawler 1108 is configured to generate an index 1110 of the energy-related data 1102, including a restricted portion 1112 of the energy-related data 1102. For example, the energy-related data 1102 may comprise the energy-related data 128 of FIG. 1, and the restricted data 1112 may comprise the restricted data 132 of FIG. 1.

As introduced above, the restricted energy-related data 1112 is not accessible to the remote server computing system 1104 for training of the search engine or indexing due to transmission or storage restriction on the restricted data. Accordingly, and in one potential advantage of the present disclosure, the remote server 1104 is configured to receive energy-related training data 1114, which is used to train a query engine 1116 to parse a query 1118 and to query the index 1110 at the one or more on-premises computing devices 1106. In some examples, the query 1118 originates at the one or more on-premises computing devices. In other examples, the query 1118 is provided by the remote server 1104.

Like the energy-related training data pairs 1010 of FIG. 10, in some examples, the energy-related training data 1114 is an unrestricted subset of the energy-related data 1102. In other examples, the energy-related training data 1114 comprises a dataset that is not derived from the energy-related data 1102, but which shares similar data characteristics.

The one or more on-premises computing devices 1106 are configured to receive, from the remote server computing system, the trained query engine 1116, which is deployed via the cloud service data plane (e.g., the data plane 118). As introduced above, the trained query engine is configured to parse and execute a query on restricted energy-related data that is not accessible to the remote server computing system due to transmission or storage restriction on the restricted data.

In this manner, the query engine 1116 is used to process the query 1118 locally at the one or more local on-premises computing devices 1106, thereby enabling restricted data to be queried. In some examples, adaptive learning (which may be less computationally intensive than initial training) takes place at the one or more on-premises computing devices 1106 to adapt the query function 1116 to the restricted data 1112.

The one or more on-premises computing devices 1106 receive the index 1110 of at least the restricted energy-related data (e.g., produced by the crawler 1108) and the query 1118. The query engine 1116 is used to parse the query 1118 and execute the parsed query on the index 1110 to thereby generate one or more query results 1120. In some examples, a result 1120 returned in response to the query 1118 is output to the cloud service data plane. In this manner, the remote server 1104 is configured to receive, via the cloud service data plane, the result 1120 of the query.

With reference again to FIG. 1, the one or more extracted features 140 from at least the portion 132 of the energy-related data 128 are output to the data plane 118. For example, the one or more extracted features 140 may comprise the classified label 1018 and/or the reduced-dimensionality dataset 1024 of FIG. 10, or the query result 1120 of FIG. 11. In this manner, the remote server 102 and/or the local edge device 104 receive the one or more extracted features 140, when the one or more extracted features 140 are not subject to the data transmission restriction or the local storage restriction.

Figure 12B:
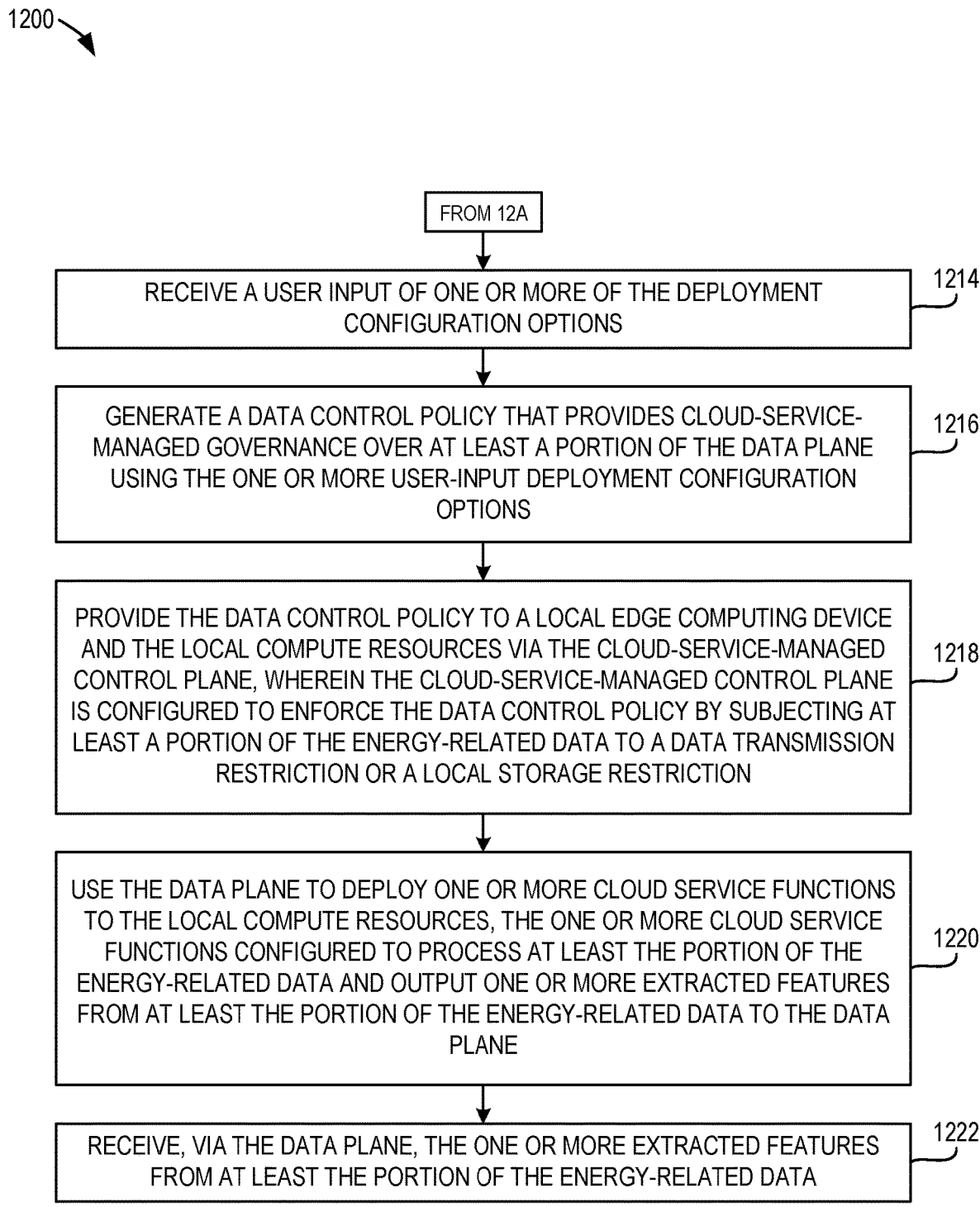

With reference now to FIGS. 12A-12B, a flowchart is illustrated depicting an example method 1200 for providing cloud-service-managed governance in a hybrid cloud environment comprising a cloud-service-managed control plane and a data plane utilizing local compute resources and storage located on-premises at an energy production or distribution facility. The following description of method 1200 is provided with reference to the software and hardware components described above and shown in FIGS. 1-11 and 13, and the method steps in method 1200 will be described with reference to corresponding portions of FIGS. 1-11 and 13 below. For example, the method 1200 may be performed at the remote server 102 of FIG. 1. It will be appreciated that method 1200 also may be performed in other contexts using other suitable hardware and software components.

It will be appreciated that the following description of method 1200 is provided by way of example and is not meant to be limiting. It will be understood that various steps of method 1200 can be omitted or performed in a different order than described, and that the method 1200 can include additional and/or alternative steps relative to those illustrated in FIGS. 12A and 12B without departing from the scope of this disclosure.

With reference now to FIG. 12A, the method 1200 includes, at 1202, presenting a user interface with a plurality of deployment configuration options including compute configuration options and data storage configuration options for energy-related data within the hybrid cloud environment. For example, the user interface may comprise the user interface 120 of FIG. 1 and/or the user interface 200 of FIGS. 2-9.

As indicated at 1204, in some examples, the plurality of deployment configuration options includes a regulatory compliance template, such as the regulatory compliance template 258 of FIG. 5, specifying that the energy-related data is stored on one or more storage devices located within a geographic area, and the energy-related data is subject to a data transmission restriction within the geographic area. At 1206, in some examples, the method 1200 comprises determining that the remote server computing system is located in a sovereign cloud, wherein the regulatory compliance template permits access to the energy-related data via the sovereign cloud, and receiving via the data plane, at least the portion of the energy-related data subject to the data transmission restriction or the local storage restriction.

In some examples, at 1208, the method 1200 includes determining that a latency of a network connection between the remote server computing system and the local edge computing device is greater than or equal to a threshold latency, wherein the plurality of deployment configuration options includes a high-latency network template (such as the high-latency network template 260 of FIG. 7) specifying that the energy-related data is processed at the local edge computing device; and based on determining that the latency of the network connection is greater than or equal to the threshold latency, populating the user interface with the high-latency network template.

At 1210, in some examples, the method 1200 comprises determining that a data volume of the energy-related data is greater than or equal to a threshold data volume, wherein the plurality of deployment configuration options includes a high-data-volume template (such as the high volume template 262 of FIG. 8) specifying that the energy-related data is stored and processed at the local edge computing device; and based on determining that the data volume of the energy-related data is greater than or equal to the threshold data volume, populating the user interface with the high-data-volume template.

In some examples, at 1212, the method 1200 comprises determining that a network connection between the local edge computing device and the local compute resources is intermittent, wherein the plurality of deployment configuration options includes an intermittent connection template (such as the intermittent connection template 264 of FIG. 9) specifying that the energy-related data is cached and processed on the local compute resources and storage; and based on determining that the network connection is intermittent, populating the user interface with the intermittent connection template.

With reference now to FIG. 12B, the method 1200 comprises receiving a user input of one or more of the deployment configuration options. For example, the remote server 102 may receive the user input via the user interface 120 of FIG. 1 or the user interface 200 of FIGS. 2-9.

The method 1200 further comprises, at 1216, generating a data control policy that provides cloud-service-managed governance over at least a portion of the data plane using the one or more user-input deployment configuration options. At 1218, the method 1200 comprises providing the data control policy to a local edge computing device and the local compute resources via the cloud-service-managed control plane, wherein the cloud-service-managed control plane is configured to enforce the data control policy by subjecting at least a portion of the energy-related data to a data transmission restriction or a local storage restriction.

At 1220, the method 1200 comprises using the data plane to deploy one or more cloud service functions to the local compute resources, the one or more cloud service functions configured to process at least the portion of the energy-related data and output one or more extracted features from at least the portion of the energy-related data to the data plane. For example, the data plane 118 of FIG. 1 is used to deploy the cloud service functions 138 to the local edge device 104 and/or the one or more on-premises computing devices 106. Similarly, the trained machine learning function 1016 of FIG. 10 is deployed to the one or more on-premises computing devices 1006 of FIG. 10, and the query engine 1116 of FIG. 11 is deployed to the one or more on-premises computing devices 1106 of FIG. 11.

With reference again to FIG. 12B, the method 1200 comprises, at 1222, receiving, via the data plane, the one or more extracted features from at least the portion of the energy-related data. For example, the remote server 102 of FIG. 1 receives the extracted features 140 from the local edge device 104 and/or the one or more on-premises computing devices 106 via the data plane 118. Similarly, the remote server 1004 of FIG. 10 receives a classified label 1018 output by the trained machine learning function 1016, and the remote server 1104 can receive a result 1120 output in response to a query 1118. Advantageously, the hybrid cloud system governance disclosed herein enables data, configuration parameters, applications, and services to be deployed at various locations in a uniform manner, preventing the development of a fragmented ecosystem of data types, data formats, tools and services that can occur in other deployments.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
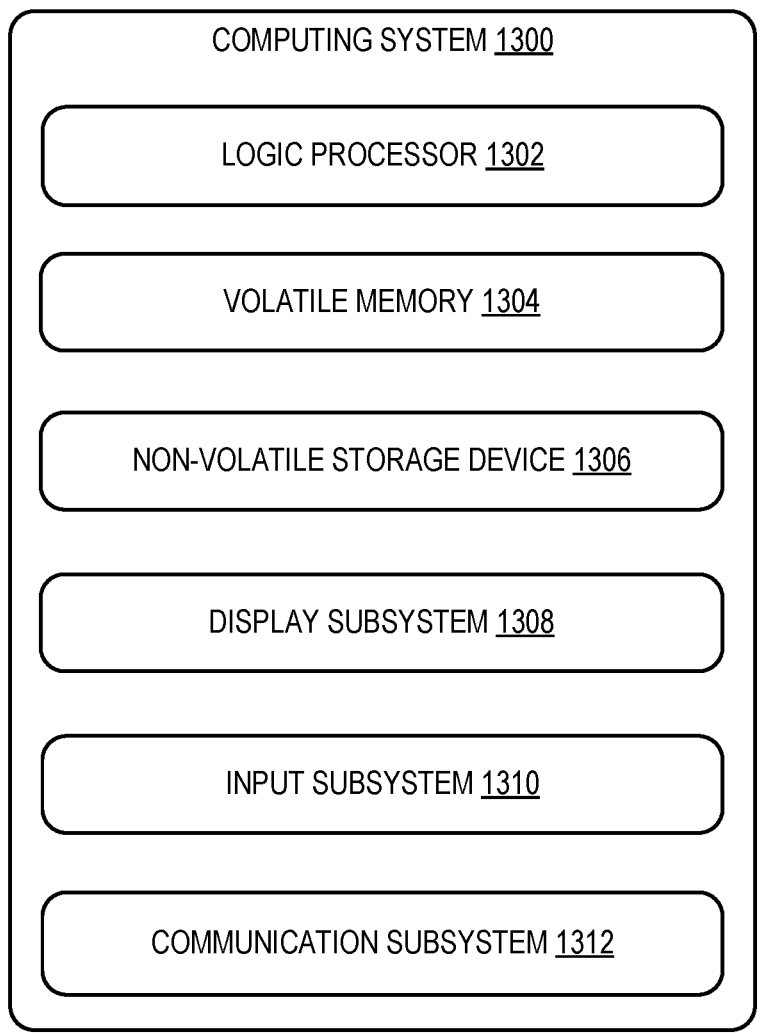
FIG. 13 shows a block diagram of an example computing system.

FIG. 13 schematically shows an example of a computing system 1300 that can enact one or more of the devices and methods described above. Computing system 1300 is shown in simplified form. Computing system 1300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. In some examples, the computing system 1300 may embody the remote server 102 of FIG. 1, the local edge device 104 of FIG. 1, the one or more on-premises computing devices 106 of FIG. 1, the remote server 1004 of FIG. 10, the one or more on-premises computing devices 1006 of FIG. 10, the remote server 1104 of FIG. 11, or the one or more on-premises computing devices 1106 of FIG. 11.

The computing system 1300 includes a logic processor 1302 volatile memory 1304, and a non-volatile storage device 1306. The computing system 1300 may optionally include a display subsystem 1308, input subsystem 1310, communication subsystem 1312, and/or other components not shown in FIG. 13.

Logic processor 1302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1306 includes one or more physical devices configured to hold instructions executable by the logic processors to implement the methods and processes described herein. When such methods and processes are implemented, the state of non-volatile storage device 1306 may be transformed—e.g., to hold different data.

Non-volatile storage device 1306 may include physical devices that are removable and/or built in. Non-volatile storage device 1306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1306 may include nonvolatile, dynamic, static, read/write, read-only, sequential-access, location-addressable, file-addressable, and/or content-addressable devices. It will be appreciated that non-volatile storage device 1306 is configured to hold instructions even when power is cut to the non-volatile storage device 1306.

Volatile memory 1304 may include physical devices that include random access memory. Volatile memory 1304 is typically utilized by logic processor 1302 to temporarily store information during processing of software instructions. It will be appreciated that volatile memory 1304 typically does not continue to store instructions when power is cut to the volatile memory 1304.

Aspects of logic processor 1302, volatile memory 1304, and non-volatile storage device 1306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "engine" may be used to describe an aspect of computing system 1300 typically implemented in software by a processor to perform a particular function using portions of volatile memory, which function involves transformative processing that specially configures the processor to perform the function. Thus, a program or engine may be instantiated via logic processor 1302 executing instructions held by non-volatile storage device 1306, using portions of volatile memory 1304. It will be understood that different programs and/or engines may be instantiated from the same application, service, code block, object, library, routine, API, function, etc. Likewise, the same program and/or engine may be instantiated by different applications, services, code blocks, objects, routines, APIs, functions, etc. The terms "program" and "engine" may encompass individual or groups of executable files, data files, libraries, drivers, scripts, database records, etc.

When included, display subsystem 1308 may be used to present a visual representation of data held by non-volatile storage device 1306. The visual representation may take the form of a GUI. As the herein described methods and processes change the data held by the non-volatile storage device, and thus transform the state of the non-volatile storage device, the state of display subsystem 1308 may likewise be transformed to visually represent changes in the underlying data. Display subsystem 1308 may include one or more display devices utilizing virtually any type of technology. Such display devices may be combined with logic processor 1302, volatile memory 1304, and/or non-volatile storage device 1306 in a shared enclosure, or such display devices may be peripheral display devices.

When included, input subsystem 1310 may comprise or interface with one or more user-input devices such as a keyboard, mouse, touch screen, or game controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1312 may be configured to communicatively couple various computing devices described herein with each other, and with other devices. Communication subsystem 1312 may include wired and/or wireless communication devices compatible with one or more different communication protocols. For example, the communication subsystem may be configured for communication via a wireless telephone network, or a wired or wireless local- or wide-area network. In some examples, the communication subsystem may allow computing system 1300 to send and/or receive messages to and/or from other devices via a network such as the Internet.

Figure 14B:
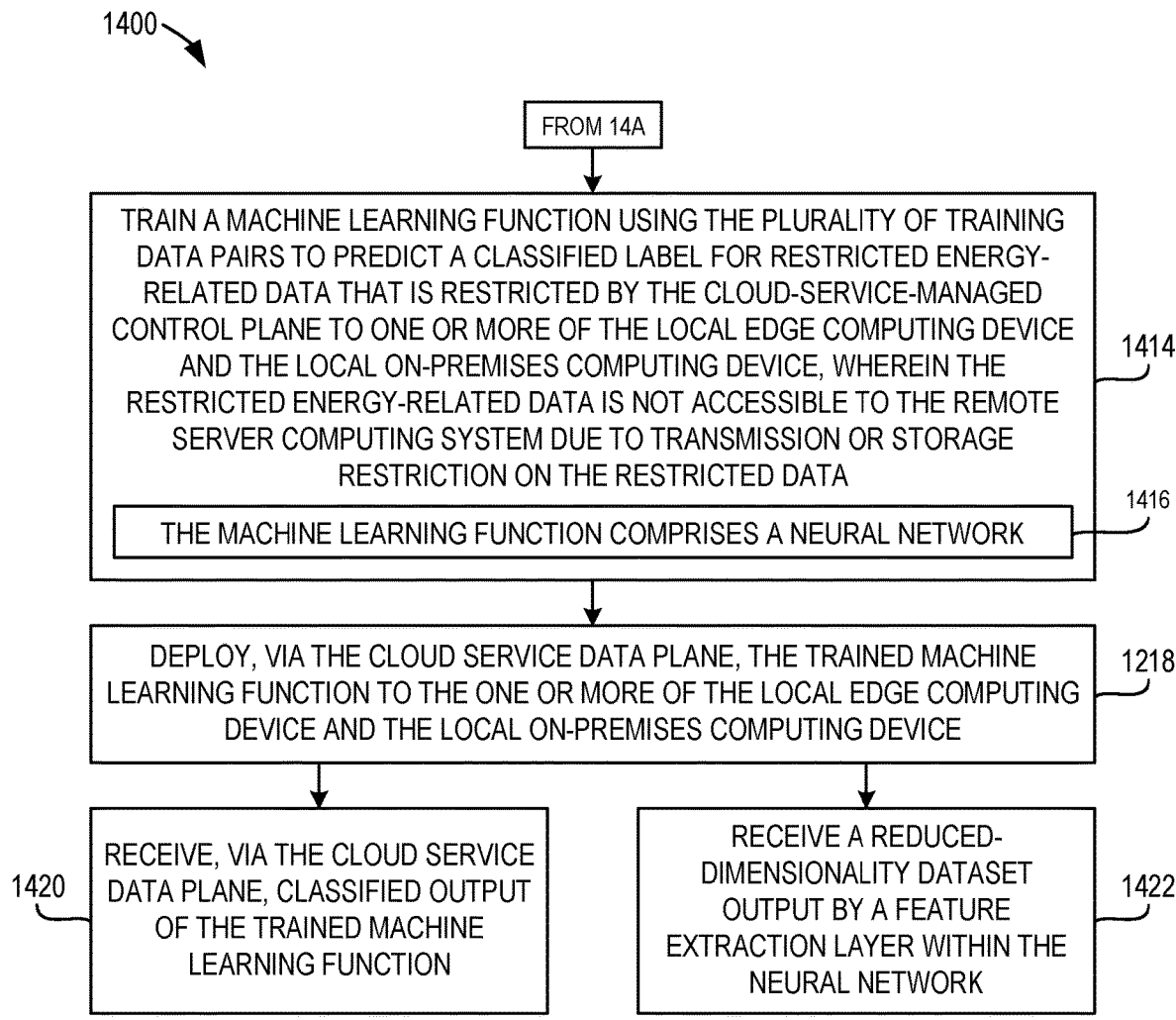

With reference now to FIGS. 14A-14B, a flowchart is illustrated depicting an example method 1400 for processing energy-related data in a hybrid cloud environment comprising a cloud-service-managed control plane and a data plane utilizing local compute resources and storage located on-premises at an energy production or distribution facility. As introduced above, the cloud-service-managed control plane and the data plane span a remote server computing system, a local edge computing device, and a local on-premises computing device. The following description of method 1400 is provided with reference to the software and hardware components described above and shown in FIGS. 1-13 and the method steps in method 1400 will be described with reference to corresponding portions of FIGS. 1-13 below. For example, the method 1400 may be performed at the remote server 102 of FIG. 1. It will be appreciated that method 1400 also may be performed in other contexts using other suitable hardware and software components.

It will be appreciated that the following description of method 1400 is provided by way of example and is not meant to be limiting. It will be understood that various steps of method 1400 can be omitted or performed in a different order than described, and that the method 1400 can include additional and/or alternative steps relative to those illustrated in FIGS. 14A and 14B without departing from the scope of this disclosure.

With reference now to FIG. 14A, the method 1240 includes, at 1402, receiving energy-related training data including a plurality of energy-related training data pairs. Each energy-related training data pair includes as input, remote data accessible by the remote server computing system, and a label serving as ground-truth output. For example, the energy-related training data may comprise the energy-related training data 1008 of FIG. 10.

As indicated at 1404, in some examples, the cloud-service-managed control plane is configured to enforce a regulatory compliance data control policy, such as a policy based upon the regulatory compliance template 258 of FIG. 5, specifying that the energy-related data is stored on one or more storage devices located within a geographic area, and the energy-related data is subject to the data transmission restriction within the geographic area.

In some examples, at 1406, the method 1400 includes determining that a latency of a connection between the remote server computing system and the local edge computing device is greater than or equal to a threshold latency. Based on determining that the latency of the network connection is greater than or equal to the threshold latency, the cloud-service-managed control plane is configured to enforce a high-latency network template (such as the high-latency network template 260 of FIG. 7) specifying that the energy-related data is processed at the local edge computing device.

At 1408, in some examples, the method 1400 includes determining that a data volume of the energy-related data is greater than or equal to a threshold data volume. Based on determining that the data volume of the energy-related data is greater than or equal to the threshold data volume, the cloud-service-managed control plane is configured to enforce a high-data-volume template (such as the high-volume template 262 of FIG. 8) specifying that the energy-related data is stored and processed at the local edge computing device.

In some examples, at 1410, the method 1400 includes determining that a network connection between the local edge computing device and the local on-premises computing device is intermittent. Based on determining that the network connection is intermittent, the cloud-service-managed control plane is configured to enforce an intermittent connection template (such as the intermittent connection template 264 of FIG. 9) specifying that the energy-related data is cached and processed on the local compute resources and storage.

At 1412, in some examples, the remote data accessible by the remote server computing system comprises an unrestricted subset of the energy-related data. For example, the remote data accessible by the remote server computing system may comprise the unrestricted data 136 of FIG. 1.

With reference now to FIG. 14B, at 1414, the method 1400 comprises training a machine learning function (such as the ML function 1016 of FIG. 10) using the plurality of training data pairs to predict a classified label for restricted energy-related data that is restricted by the cloud-service-managed control plane to one or more of the local edge computing device and the local on-premises computing device. The restricted energy-related data is not accessible to the remote server computing system due to transmission or storage restriction on the restricted data. As indicated at 1416, in some examples, the machine learning function comprises a neural network.

At 1418, the method 1400 comprises deploying, via the cloud service data plane, the trained machine learning function to the one or more of the local edge computing device and the local on-premises computing device. For example, the data plane 118 of FIG. 1 may be used to deploy the trained machine learning function. The trained machine learning function 1016 of FIG. 10 is deployed to the one or more on-premises computing devices 1006 of FIG. 10, and the query engine 1116 of FIG. 11 is deployed to the one or more on-premises computing devices 1106 of FIG. 11.

The method 1400 further comprises, at 1420, receiving, via the cloud service data plane, classified output of the trained machine learning function. For example, the remote server 1004 of FIG. 10 receives a classified label 1018 output by the trained machine learning function 1016, and the remote server 1104 can receive a result 1120 output in response to a query 1118.

The method 1400 may additionally or alternatively include, at 1422, receiving a reduced-dimensionality dataset output by a feature extraction layer within the neural network. For example, the remote server 1004 of FIG. 10 may receive an unrestricted portion (e.g., the unrestricted output data 1034) of the reduced-dimensionality dataset 1030. In this manner, the method 1400 may overcome issues associated with processing large or restricted datasets in a cloud service environment.

The following paragraphs discuss several aspects of the present disclosure. According to one aspect of the present disclosure, a remote server computing system comprises a processor and a memory storing instructions executable by the processor. The instructions are executable to deploy a cloud-service-managed control plane and a cloud service data plane spanning the remote server computing system, a local edge computing device, and a local on-premises computing device. The remote server computing system, the local edge computing device, and the local on-premises computing device are connected in a hybrid cloud environment. Energy-related training data is received including a plurality of energy-related training data pairs. Each energy-related training data pair includes, as input, remote data accessible by the remote server computing system, and a label serving as ground-truth output. A machine learning function is trained using the plurality of training data pairs to predict a classified label for restricted energy-related data that is restricted by the cloud-service-managed control plane to one or more of the local edge computing device and the local on-premises computing device. The restricted energy-related data is not accessible to the remote server computing system due to transmission or storage restriction on the restricted data. The trained machine learning function is deployed via the cloud service data plane to the one or more of the local edge computing device and the local on-premises computing device. Classified output of the trained machine learning function is received via the cloud service data plane.

The cloud-service-managed control plane may be additionally or alternatively configured to enforce a regulatory compliance data control policy specifying that the energy-related data is stored on one or more storage devices located within a geographic area, and the energy-related data is subject to the data transmission restriction within the geographic area.

The remote server computing system may additionally or alternatively include a network connection between the remote server computing system and the local edge computing device. The instructions may be additionally or alternatively executable to determine that a latency of the network connection is greater than or equal to a threshold latency; and based on determining that the latency of the network connection is greater than or equal to the threshold latency, the cloud-service-managed control plane is configured to enforce a high-latency network template specifying that the energy-related data is processed at the local edge computing device.

The instructions may be additionally or alternatively executable to determine that a data volume of the energy-related data is greater than or equal to a threshold data volume; and based on determining that the data volume of the energy-related data is greater than or equal to the threshold data volume, the cloud-service-managed control plane is configured to enforce a high-data-volume template specifying that the energy-related data is stored and processed at the local edge computing device.

The remote server computing system may additionally or alternatively include a network connection between the local edge computing device and the local on-premises computing device. The instructions may be additionally or alternatively executable to determine that the network connection is intermittent; and based on determining that the network connection is intermittent, the cloud-service-managed control plane is configured to enforce an intermittent connection template specifying that the energy-related data is cached and processed on the local compute resources and storage.

The local on-premises computing device may additionally or alternatively comprise one or more physical computing devices running a cluster comprising a plurality of virtual machines.

A container platform of the local on-premises computing device may additionally or alternatively be a foundation for applications and services to be deployed across the hybrid cloud environment.

The cloud-service-managed control plane device may additionally or alternatively be configured to enforce a data control policy comprising one or more files in a distributed version control repository.

The remote data accessible by the remote server computing system may additionally or alternatively comprise an unrestricted subset of the energy-related data.

The machine learning function may additionally or alternatively comprise a neural network.

The instructions may be additionally or alternatively executable to receive a reduced-dimensionality dataset output by a feature extraction layer within the neural network.

Another aspect of the present disclosure provides, at a computing device, a method for processing energy-related data in a hybrid cloud environment comprising a cloud-service-managed control plane and a data plane utilizing local compute resources and storage located on-premises at an energy production or distribution facility. The cloud-service-managed control plane and the data plane span a remote server computing system, a local edge computing device, and a local on-premises computing device. The method comprises receiving energy-related training data including a plurality of energy-related training data pairs. Each energy-related training data pair includes as input, remote data accessible by the remote server computing system, and a label serving as ground-truth output. The method further comprises training a machine learning function using the plurality of training data pairs to predict a classified label for restricted energy-related data that is restricted by the cloud-service-managed control plane to one or more of the local edge computing device and the local on-premises computing device. The restricted energy-related data is not accessible to the remote server computing system due to transmission or storage restriction on the restricted data. The method further comprises deploying, via the cloud service data plane, the trained machine learning function to the one or more of the local edge computing device and the local on-premises computing device. Classified output of the trained machine learning function is received via the cloud service data plane.

The cloud-service-managed control plane may be additionally or alternatively configured to enforce a regulatory compliance data control policy specifying that the energy-related data is stored on one or more storage devices located within a geographic area, and the energy-related data is subject to the data transmission restriction within the geographic area.

The method may additionally or alternatively include determining that a latency of a connection between the remote server computing system and the local edge computing device is greater than or equal to a threshold latency; and based on determining that the latency of the network connection is greater than or equal to the threshold latency, the cloud-service-managed control plane is configured to enforce a high-latency network template specifying that the energy-related data is processed at the local edge computing device.

The method may additionally or alternatively include determining that a data volume of the energy-related data is greater than or equal to a threshold data volume; and based on determining that the data volume of the energy-related data is greater than or equal to the threshold data volume, the cloud-service-managed control plane is configured to enforce a high-data-volume template specifying that the energy-related data is stored and processed at the local edge computing device.

The method may additionally or alternatively include determining that a network connection between the local edge computing device and the local on-premises computing device is intermittent; and based on determining that the network connection is intermittent, the cloud-service-managed control plane is configured to enforce an intermittent connection template specifying that the energy-related data is cached and processed on the local compute resources and storage.

The remote data accessible by the remote server computing system may additionally or alternatively comprise an unrestricted subset of the energy-related data.

The machine learning function may additionally or alternatively comprise a neural network. The method may additionally or alternatively include receiving a reduced-dimensionality dataset output by a feature extraction layer within the neural network.

Another aspect of the present disclosure provides a computing system comprising a processor and a memory storing instructions executable by the processor. The instructions are executable to output energy-related training data accessible by a remote server computing system. A trained query engine is received from the remote server computing system. The trained query engine is configured to parse and execute a query on restricted energy-related data that is restricted by the cloud-service-managed control plane to one or more of the local edge computing device and the local on-premises computing device. The restricted energy-related data is not accessible to the remote server computing system due to transmission or storage restriction on the restricted data. The instructions are further executable to receive an index of at least the restricted energy-related data. A query is received. The query engine is used to parse the query and execute the parsed query on the index to thereby generate one or more query results. The instructions are further executable to output the one or more query results.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A remote server computing system, comprising:
   a processor; and
   a memory storing instructions executable by the processor to:
      deploy a cloud-service-managed control plane and a cloud service data plane spanning the remote server computing system, a local edge computing device, and a local on-premises computing device, wherein the remote server computing system, the local edge computing device, and the local on-premises computing device are connected in a hybrid cloud environment, and wherein the cloud service data plane facilitates data transmission between the remote server computing system, the local edge computing device, and the local on-premises computing device based upon a data control policy enforced by the cloud-service-managed control plane;
      receive energy-related training data including a plurality of energy-related training data pairs, each energy-related training data pair including,
         as input, remote data accessible by the remote server computing system, and
         a label serving as ground-truth output;
      train a machine learning function using the plurality of training data pairs to predict a classified label for restricted energy-related data that is restricted by the data control policy to a geographic region, wherein the restricted energy-related data is not accessible to the remote server computing system due to transmission or storage restriction on the restricted data;
      deploy, via the cloud service data plane, the trained machine learning function to one or more of the local edge computing device or the local on-premises computing device, wherein the one or more of the local edge computing device or the local on-premises computing device are located within the geographic region; and
      receive, via the cloud service data plane, classified output of the trained machine learning function, wherein the classified output is not subject to the transmission or storage restriction.

2. The remote server computing system of claim 1, wherein the cloud-service-managed control plane is configured to enforce a regulatory compliance data control policy specifying that the energy-related data is stored on one or more storage devices located within the geographic area, and the energy-related data is subject to the data transmission restriction within the geographic area.

3. The remote server computing system of claim 1, further comprising a network connection between the remote server computing system and the local edge computing device, wherein the instructions are further executable to:
   determine that a latency of the network connection is greater than or equal to a threshold latency; and
   based on determining that the latency of the network connection is greater than or equal to the threshold latency, the cloud-service-managed control plane is configured to enforce a high-latency network template specifying that the energy-related data is processed at the local edge computing device.

4. The remote server computing system of claim 1, wherein the instructions are further executable to:
   determine that a data volume of the energy-related data is greater than or equal to a threshold data volume; and
   based on determining that the data volume of the energy-related data is greater than or equal to the threshold data volume, the cloud-service-managed control plane is configured to enforce a high-data-volume template specifying that the energy-related data is stored and processed at the local edge computing device.

5. The remote server computing system of claim 1, further comprising a network connection between the local edge computing device and the local on-premises computing device, wherein the instructions are further executable to:
   determine that the network connection is intermittent; and
   based on determining that the network connection is intermittent, the cloud-service-managed control plane is configured to enforce an intermittent connection template specifying that the energy-related data is cached and processed on the local compute resources and storage.

6. The remote server computing system of claim 1, wherein the local on-premises computing device comprises one or more physical computing devices running a cluster comprising a plurality of virtual machines.

7. The remote server computing system of claim 1, wherein a container platform of the local on-premises computing device is a foundation for applications and services to be deployed across the hybrid cloud environment.

8. The remote server computing system of claim 1, wherein the data control policy comprises one or more files in a distributed version control repository.

9. The remote server computing system of claim 1, wherein the remote data accessible by the remote server computing system comprises an unrestricted subset of the energy-related data.

10. The remote server computing system of claim 1, wherein the machine learning function comprises a neural network.

11. The remote server computing system of claim 10, wherein the instructions are further executable to receive a reduced-dimensionality dataset output by a feature extraction layer within the neural network.

12. At a computing device, a method for processing energy-related data in a hybrid cloud environment comprising a cloud-service-managed control plane and a data plane utilizing local compute resources and storage located on-premises at an energy production or distribution facility, the cloud-service-managed control plane and the data plane spanning a remote server computing system, a local edge computing device, and a local on-premises computing device, the method comprising:
- receiving energy-related training data including a plurality of energy-related training data pairs, each energy-related training data pair including,
  - as input, remote data accessible by the remote server computing system, and
  - a label serving as ground-truth output;
- training a machine learning function using the plurality of training data pairs to predict a classified label for restricted energy-related data that is restricted by the cloud-service-managed control plane to a geographic region, wherein the restricted energy-related data is not accessible to the remote server computing system due to transmission or storage restriction on the restricted data; and wherein a cloud service data plane facilitates data transmission between the remote server computing system, the local edge computing device, and the local on-premises computing device based upon a data control policy enforced by the cloud-service-managed control plane;
- deploying, via the cloud service data plane, the trained machine learning function to one or more of the local edge computing device or the local on-premises computing device, wherein the one or more of the local edge computing device or the local on-premises computing device are located within the geographic region; and
- receiving, via the cloud service data plane, classified output of the trained machine learning function, wherein the classified output is not subject to the transmission or storage restriction.

13. The method of claim 12, wherein the cloud-service-managed control plane is configured to enforce a regulatory compliance data control policy specifying that the energy-related data is stored on one or more storage devices located within the geographic area, and the energy-related data is subject to the data transmission restriction within the geographic area.

14. The method of claim 12, further comprising:
- determining that a latency of a connection between the remote server computing system and the local edge computing device is greater than or equal to a threshold latency; and
- based on determining that the latency of the network connection is greater than or equal to the threshold latency, the cloud-service-managed control plane is configured to enforce a high-latency network template specifying that the energy-related data is processed at the local edge computing device.

15. The method of claim 12, further comprising:
- determining that a data volume of the energy-related data is greater than or equal to a threshold data volume; and
- based on determining that the data volume of the energy-related data is greater than or equal to the threshold data volume, the cloud-service-managed control plane is configured to enforce a high-data-volume template specifying that the energy-related data is stored and processed at the local edge computing device.

16. The method of claim 12, further comprising:
- determining that a network connection between the local edge computing device and the local on-premises computing device is intermittent; and
- based on determining that the network connection is intermittent, the cloud-service-managed control plane is configured to enforce an intermittent connection template specifying that the energy-related data is cached and processed on the local compute resources and storage.

17. The method of claim 12, wherein the remote data accessible by the remote server computing system comprises an unrestricted subset of the energy-related data.

18. The method of claim 12, wherein the machine learning function comprises a neural network.

19. The method of claim 18, further comprising receiving a reduced-dimensionality dataset output by a feature extraction layer within the neural network.

* * * * *